United States Patent
Dreessen et al.

(10) Patent No.: US 10,882,423 B2
(45) Date of Patent: Jan. 5, 2021

(54) LOAD PATH-OPTIMIZED HYBRID SUPPORT STRUCTURE

(71) Applicants: Volkswagen Aktiengesellschaft, Wolfsburg (DE); Sitech Sitztechnik GmbH, Wolfsburg (DE)

(72) Inventors: Philipp Dreessen, Stuttgart (DE); Arne Gerdes, Sickte (DE); Stefan Huinink, Lehre (DE); Slawomir Gadek, Jerzmanowa (PL)

(73) Assignees: Volkswagen Aktiengesellschaft, Wolfsburg (DE); Sitech Sitztechnik GmbH, Wolfsburg (DE)

( * ) Notice: Subject to any disclaimer, the term of this patent is extended or adjusted under 35 U.S.C. 154(b) by 76 days.

(21) Appl. No.: 16/335,037

(22) PCT Filed: Aug. 3, 2017

(86) PCT No.: PCT/EP2017/069718
§ 371 (c)(1),
(2) Date: Jun. 18, 2019

(87) PCT Pub. No.: WO2018/054593
PCT Pub. Date: Mar. 29, 2018

(65) Prior Publication Data
US 2020/0009999 A1 Jan. 9, 2020

(30) Foreign Application Priority Data
Sep. 20, 2016 (DE) .......................... 10 2016 217 952

(51) Int. Cl.
*B60N 2/32* (2006.01)
*B60N 2/68* (2006.01)

(52) U.S. Cl.
CPC ............... *B60N 2/32* (2013.01); *B60N 2/682* (2013.01); *B60N 2/686* (2013.01); *B60N 2002/684* (2013.01); *B60N 2205/35* (2013.01)

(58) Field of Classification Search
CPC .......... B60N 2/32; B60N 2/682; B60N 2/686; B60N 2002/684; B60N 2205/35
See application file for complete search history.

(56) References Cited

U.S. PATENT DOCUMENTS

| | | | | |
|---|---|---|---|---|
| 6,347,836 B1 * | 2/2002 | Hayotte | ................... | B60N 2/20 297/378.1 |
| 6,386,638 B1 * | 5/2002 | Strauch | ................... | B60N 2/68 297/452.18 |

(Continued)

FOREIGN PATENT DOCUMENTS

| | | |
|---|---|---|
| DE | 3839855 A1 | 5/1990 |
| DE | 10014332 A1 | 10/2001 |

(Continued)

OTHER PUBLICATIONS

International Search Report dated Oct. 27, 2017 in corresponding application PCT/EP2017/069718.

*Primary Examiner* — Philip F Gabler
(74) *Attorney, Agent, or Firm* — Muncy, Geissler, Olds & Lowe, P.C.

(57) ABSTRACT

A hybrid support structure for a backrest part of a vehicle seat or a back bench seat, which is formed from a metal structure and a plastic structure, the metal structure including at least one connecting profile disposed between two side rail profiles of the hybrid support structure. It is provided that the connecting profile, together with a central rib of a web structure designed as a plastic structure follows a load path-optimized main load line, which runs between two connecting points of the connecting profile on the side (Continued)

rail profiles, taking into account a force acting upon the hybrid support structure in at least one assumed load case.

16 Claims, 14 Drawing Sheets

(56) References Cited

U.S. PATENT DOCUMENTS

| | | | |
|---|---|---|---|
| 6,421,979 B1* | 7/2002 | Fischer | B29C 65/56 403/363 |
| 6,783,184 B2* | 8/2004 | DiBattista | B29C 49/20 297/452.14 |
| 6,811,195 B2 | 11/2004 | Klocke et al. | |
| 7,399,036 B2* | 7/2008 | Kowal | B60N 2/22 297/440.16 |
| 7,731,293 B1* | 6/2010 | Donovan | B60N 2/686 297/452.18 |
| 7,891,740 B2* | 2/2011 | Boes | B60N 2/686 297/452.18 |
| 8,096,620 B2* | 1/2012 | Wilson | B60N 2/686 297/440.14 |
| 8,905,475 B2* | 12/2014 | Schenten | B60N 2/2893 297/232 |
| 9,016,795 B2* | 4/2015 | Nakagaki | B60N 2/68 297/452.18 |
| 9,168,855 B2 | 10/2015 | Evans et al. | |
| 9,227,541 B2* | 1/2016 | Hosbach | B60N 2/36 |
| 9,254,770 B2 | 2/2016 | Nuyan et al. | |
| 9,327,434 B2 | 5/2016 | Zynda et al. | |
| 9,376,045 B2* | 6/2016 | Maeta | B60N 2/686 |
| 9,486,949 B2 | 11/2016 | Evans et al. | |
| 9,724,858 B2 | 8/2017 | Ribaric et al. | |
| 2002/0195858 A1 | 12/2002 | Jungert et al. | |
| 2003/0077409 A1 | 4/2003 | Schnell | |
| 2008/0164743 A1* | 7/2008 | Robert | B60N 2/682 297/452.2 |
| 2012/0261956 A1* | 10/2012 | Nasshan | B60N 2/4214 297/232 |
| 2015/0175045 A1 | 6/2015 | Kuhley et al. | |
| 2015/0314501 A1* | 11/2015 | Maslakow | B60N 2/68 297/452.18 |
| 2016/0159063 A1 | 6/2016 | Nuyan et al. | |
| 2017/0368973 A1 | 12/2017 | Seo et al. | |

FOREIGN PATENT DOCUMENTS

| | | |
|---|---|---|
| DE | 10149522 A1 | 4/2003 |
| DE | 102007041222 A1 | 3/2009 |
| DE | 102008038851 A1 | 2/2010 |
| DE | 102008042325 A1 | 4/2010 |
| DE | 202008015401 U1 | 4/2010 |
| DE | 102009040902 A1 | 3/2011 |
| DE | 102013021384 A1 | 7/2014 |
| DE | 102013021692 A1 | 6/2015 |
| EP | 1057691 A1 | 12/2000 |
| EP | 1084816 A2 | 3/2001 |
| EP | 1262362 A1 | 12/2002 |
| EP | 1564067 A1 | 8/2005 |
| EP | 2233352 A1 | 9/2010 |
| EP | 2495125 A1 | 9/2012 |
| JP | 2004229688 A | 8/2004 |
| WO | WO2008019981 A1 | 2/2008 |
| WO | WO2011036185 A1 | 3/2011 |
| WO | WO2012032189 A1 | 3/2012 |
| WO | WO2013127972 A2 | 9/2013 |
| WO | WO2016113358 A1 | 7/2016 |

* cited by examiner

LOAD PATH-OPTIMIZED HYBRID SUPPORT STRUCTURE

This nonprovisional application is a National Stage of International Application No. PCT/EP2017/069718, which was filed on Aug. 3, 2017, and which claims priority to German Patent Application No. 10 2016 217 952.7, which was filed in Germany on Sep. 20, 2016, and which are both herein incorporated by reference.

BACKGROUND OF THE INVENTION

Field of the Invention

The invention relates to a hybrid support structure for a backrest part of a vehicle seat or a back bench seat, which is formed from a metal structure and a plastic structure.

Description of the Background Art

The publication EP 1 262 362 A1 discloses a folding backrest for a back seat of a motor vehicle, the backrest having a continuous design, viewed over its width and being designed as an extruded hollow profile having at least one profile chamber, the extrusion direction of the extruded profile running in the direction of the backrest height.

Publication EP 1 564 067 A1 describes an assembly for a motor vehicle interior, comprising a seat backrest having a first section and a second section, which is formed separately from the first section and is connected to the first section via at least one joint to form a seat backrest. The first section or the second section is manufactured from a molded plastic and furthermore includes multiple individual, integrated reinforcing structure to form a pattern of integrated reinforcing structures. The assembly also comprises a fastening assembly for anchoring the seat backrest on at least one body in the second section of the motor vehicle, the first section and the second section being disposed at a distance from each other to form multiple open interiors therebetween, which act as ventilation openings.

A vehicle seat is also explained in the publication EP 2 495 125 A1, which has an X-shaped rib, which is connected to a frame of a back seat backrest. The reinforcing sections formed by the X-shaped rib extend linearly to multiple load points of action, whereby the forces acting upon the backseat backrest are also absorbed via the reinforcing sections.

The publication WO 2011/036185 A1 furthermore describes a method for manufacturing a vehicle seat structure. It is provided that a frame structure and reinforcing ribs and absorption ribs are formed on at least one back shell, insert components being disposed in or on the back shell and/or the frame structure.

Finally, a support structure for a backrest of a seat in a vehicle made from a polymer material is disclosed in the publication EP 2 233 352 A1, a hollow profile being formed on at least one side of the support structure, which extends from top to bottom and which is manufactured by a combined internal gas pressure and water injection process. Two formed hollow profiles are designed as diagonally running, crossing transverse ribs for stabilization purposes.

The seat structures are usually based on weight-optimized steel concepts, lightweight construction materials being used, at least in part, to reduce the component weight. The potential of the reduction to be achieved, taking sufficient stability into account, has largely been exhausted. In addition, many specific individual parts fulfilling the particular purpose are usually developed in the known approaches, which disadvantageously must be joined to form a support structure in a large number of assembly operations or joining operations.

It is known to integrate plastic parts into the support structure, as described, for example, by publication EP 1 564 067 A1.

SUMMARY OF THE INVENTION

The object of the present invention is to provide a hybrid support structure for a backrest of a seat in a motor vehicle, which is easy to manufacture and which has a low component weight and a sufficient stability adapted to the forces acting upon the support structure.

The starting point of the invention is a hybrid support structure for a backrest part of a vehicle seat or a back bench seat, which is formed from a melt structure and a plastic structure, the metal structure having at least one connecting profile disposed between two side rail profiles of the hybrid support structure.

According to the invention, it is provided that the connecting profile, together with a central rib of a web structure designed as a plastic structure, follows a load path-optimized main flux of force, which runs between two connecting points of the connecting profile on the side rail profiles, taking into account a force acting upon the hybrid support structure in at least one assumed load case.

This design is particularly advantageous, since the stability of the hybrid support structure is achieved with the aid of simple means, namely by a connecting profile between the side rail profiles and a central rib of a web structure, which is formed between the side rail profiles.

The central rib of the web structure and the connecting profile are advantageously disposed, depending on the structure, according to a preceding topology optimization process, so that, according to the invention, it is possible to react variably in this manner to different support structures with regard to the arrangement of the central rib or the connecting profile.

The metal structure and the plastic structure are preferably connected to the hybrid support structure in an injection molding process. This process advantageously permits a variable design of the geometry of both the metal structure and the plastic structure, the injection mold being able to be easily adapted to the desired metal structure and the desired plastic structure, and a complex geometric plastic structure being able to be easily manufactured by the configuration of the particular mold.

In one preferred embodiment of the invention, the metal structure is a component assembly made up of multiple metallic components, the multiple components first being assembled into the metallic component assembly and connected to each other in the injection molding process via the one-part plastic structure. This design is advantageous, since the metallic components need to be joined in only one work step, after which the connection of the multiple metallic components takes place by the plastic introduced into the injection mold, a one-part plastic component being simultaneously formed, which meets high stability requirements.

The web structure of the plastic structure is preferably an irregular spiderweb structure, which encompasses the central rib as well as the essentially horizontal ribs extending from the central rib and essentially vertical ribs, which are connected to each other via crossing points. It has advantageously been proven that the spiderweb structure having the central rib formed along the main load line has a high stability, which may be brought about by using little material, whereby the objective of reducing the weight of the hybrid support structure is achieved.

It is provided that a spanned plane of the spiderweb structure between the lateral side rail profiles of the hybrid support structure and between the headrest receptacles belonging to the plastic structure on an upper end of the hybrid support structure extends up to a horizontal rotation axis on a lower end of the hybrid support structure. Using little material, the hybrid structure is advantageously stabilized by to the spiderweb structure extending between the lateral side rail profiles over the entire.

It is further provided that the spiderweb structure of the plastic structure advantageously has a first and a second spiderweb substructure, which is formed continuously on a back side of the hybrid support structure and in an interrupted manner on a front side of the hybrid support structure. Due to this embodiment, it is possible to advantageously react to the fact that the load case requirements are different in different areas of the spiderweb structure, as explained in greater detail in the description.

It is firstly provided that a spanned plane of the first spiderweb structure between the lateral side rail profiles of the hybrid support structure and between the headrest receptacles belonging to the plastic structure on an upper end of the hybrid support structure extends up to a horizontal rotation axis that runs between the upper and lower ends of the hybrid support structure. According to the invention, the horizontal axis running between the spiderweb substructures results due to the design, the horizontal axes advantageously being disposed within the hybrid support structure, depending on the previously carried out topology optimization.

It is secondly provided that a spanned plane of the second spiderweb structure extends between the lateral side rail profiles of the hybrid support structure and between the horizontal axis between the upper and lower ends of the hybrid support structure and the horizontal rotation axis on the lower end of the hybrid support structure. An area of the hybrid support structure, which, according to the following description, may be specifically designed for a certain load case (cargo load case), advantageously results for the second spiderweb substructure.

In one preferred embodiment, which is explained in greater detail in the description, it is provided that, within the plane spanned by the second spiderweb substructure, a metallic insert is disposed between the lateral side rail profiles, which divides the second spiderweb substructure into a front-side and a back-side spiderweb substructure. The advantageous importance of the metallic insert within the second spiderweb substructure is also explained in detail in the description.

Finally, it is provided that the connecting profile disposed between the side rail profiles is designed as a C profile, which has two opposite profile legs, which extend to the back side of the hybrid support structure, between which another web structure is formed as a cross web structure, which is formed from regularly or irregularly crossing ribs, which essentially form triangular honeycombs or rectangular honeycombs, in particular square or rhombic honeycombs having crossing points. Due to this additional web structure, it is advantageously possible to provide the hybrid support structure with a very stable design. The connecting profile follows the main load line within the hybrid support structure with respect to its orientation, so that the cross web structure also follows the main load line within the connecting profile, whereby, with respect to its wall thicknesses, the connecting profile may be designed with smaller wall thicknesses compared to connecting profiles known from the prior art, so that the weight of the hybrid support structure may be reduced with the same or even a greater stability.

The side rail profiles are designed as C profiles, which have two opposite profile legs, which project laterally from the hybrid support structure, another web structure being formed between the profile legs as a cross web structure, which is formed from regularly or irregularly crossing ribs, which essentially form triangular honeycombs or rectangular honeycombs, in particular square or rhombic honeycombs having crossing points. This embodiment also contributes to the stabilization of the hybrid support structure, using little material for forming the side rail profiles, so that a lightweight and stable hybrid support structure may be advantageously formed.

It is also preferably provided that the plastic structure comprises a cushion structure receiving element, which has another web structure as a triangular web structure on the side of the cushion structure receiving element, which is formed from regularly or irregularly angled ribs, which form essentially triangular honeycombs having crossing points. Special elements, such as the cushion structure receiving element, may be advantageously provided within the plastic structure and be stabilized with the aid of the web structures.

It is also provided that the metal structure has a function element, in particular a metallic profile wire having a projection, so that a cushion structure may be fastened to the cushion structure receiving element formed from the plastic structure and the projection of the metallic profile wire. The advantage essential to the invention here is that the metallic profile wire may be easily placed into the injection mold, after which the filling of the particular mold with plastic connects the other metallic components to the metallic profile wire via the one-part plastic structure.

An embodiment is also preferred, in which metallic receiving sleeves are disposed in the side rail profiles of the hybrid support structure, which are fixedly connected to the one-part plastic structure, the plastic structure having extrusion coatings of the receiving sleeves, each of which are provided laterally with another web structure as a circular segment web structure, which is formed from ribs extending regularly or irregularly in a ray-shaped manner from the rotational axis of the receiving sleeves, whereby the circular segment web structure forms circular segment-shaped honeycombs. The advantage of this approach is that metallic receiving sleeves may be provided, which are extrusion-coated with plastic, whereby a complex hybrid support structure may be easily manufactured.

This advantage also applies to the metallic structure of the hybrid support structure, in which, in one preferred embodiment, a metallic top profile is provided with am extrusion coating of plastic as part of the plastic structure.

It is advantageously provided that the plastic structure comprises a base plate and/or a headrest receptacle, which are formed as parts of the plastic structure, whereby it becomes clear that specific approaches may be easily integrated into the hybrid support structure, additional details being explained in the following description.

It is further provided that the plastic structure has a least one web structure in a predefinable area, which has at least one energy-absorbing sacrificial rib on a side of the hybrid support structure facing away from the occupant, which deforms, taking into account a force acting upon the hybrid support structure in at least one assumed load case (cargo load case), whereby, in the assumed load case, a breaking of the plastic structure outside the at least one predefinable area of the plastic structure is avoided.

This advantageously ensures that, for example in an assumed front-end crash, in which the cargo hits the hybrid support structure, no plastic parts of the plastic structure of the hybrid support structure are able to break, due to the disposed/introduced sacrificial ribs on the side facing the occupant, since impact energy is reduced in a defined manner by the sacrificial ribs.

According to the invention, it is provided that the web structure having the at least one sacrificial rib is the spiderweb structure, which includes the first and the second spiderweb substructure. The spiderweb structure having the at least one sacrificial rib is advantageously disposed in the relevant second spiderweb substructure according to the requirements of the cargo load case.

According to the invention, it is provided that the spanned plane of the spiderweb structure having the at least one sacrificial rib between the lateral side rail profiles of the hybrid support structure and between the headrest receptacles belonging to the plastic structure on the upper end of the hybrid support structure extends up to a horizontal rotation axis on a lower end of the hybrid support structure. The area within which the second spiderweb substructure is to be disposed may be advantageously defined as a function of the topology optimization explained in the description part.

In a preferred embodiment of the invention, it is provided that the spanned plane of the first spiderweb substructure between the lateral side rail profiles of the hybrid support structure and between the headrest receptacles belonging to the plastic structure on an upper end of the hybrid support structure extends up to a horizontal rotation axis that runs between the upper and lower ends of the hybrid support structure. As a result of the topology optimization, the first spiderweb substructure is formed in the upper area of the hybrid support structure, whereby it is advantageously possible to react to specific requirements in the upper area of the hybrid support structure.

In a preferred embodiment of the invention, it is provided that the spanned plane of the second spiderweb structure extends between the lateral side rail profiles of the hybrid support structure and between a horizontal axis between the upper and lower ends of the hybrid support structure and the horizontal rotation axis on the lower end of the hybrid support structure. As a result of the topology optimization, the second spiderweb substructure is formed in a lower area of the hybrid support structure, whereby it is advantageously possible to react to specific requirements in the lower area of the hybrid support structure.

Within the plane spanned by the second spiderweb substructure, the metallic insert is preferably disposed between the lateral side rail profiles and divides the second spiderweb substructure into the second front-side and back-side spiderweb substructures, the at least one sacrificial rib being formed in the second back-side spiderweb substructure. The insert is particularly advantageous, since it protects the side of the hybrid support structure facing the occupant against any plastic parts that may break in the event of a load case, as is described in greater detail in the description part.

In one preferred embodiment of the invention, the first and the second spiderweb substructure is formed continuously on the back side of the hybrid support structure and in an interrupted manner on the front side of the hybrid support structure. It becomes clear hereby that it is possible to advantageously react to certain precautions in designing the hybrid support structure, it being explained in the description part why the spiderweb structure is interrupted on the front side of the hybrid support structure.

It is further provided that the connecting profile of the metal structure disposed between the side rail profiles is designed as a C profile, which has two opposite profile legs, which extend to the back side of the hybrid support structure, between which another web structure having at least one sacrificial rib is formed. This advantageous embodiment also permits an arrangement of at least one sacrificial rib in the area of the first spiderweb substructure, since the connecting profile of the metal structure is disposed within the first spiderweb substructure. The connecting profile thus advantageously brings about the effect that it contributes to stabilizing the hybrid support structure, a web structure being able to be formed in the hollow space of the C profile, which has at least one sacrificial rib.

Finally, it is provided that the additional web structure is designed as a cross web structure, which is formed from regularly or irregularly crossing ribs, which form triangular honeycombs or rectangular honeycombs, in particular square or rhombic honeycombs having crossing points. This cross web structure is selected on the basis of the topology optimization, since it represents a good compromise between the stability of the connecting profile and the possibility of disposing the at least one sacrificial rib.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
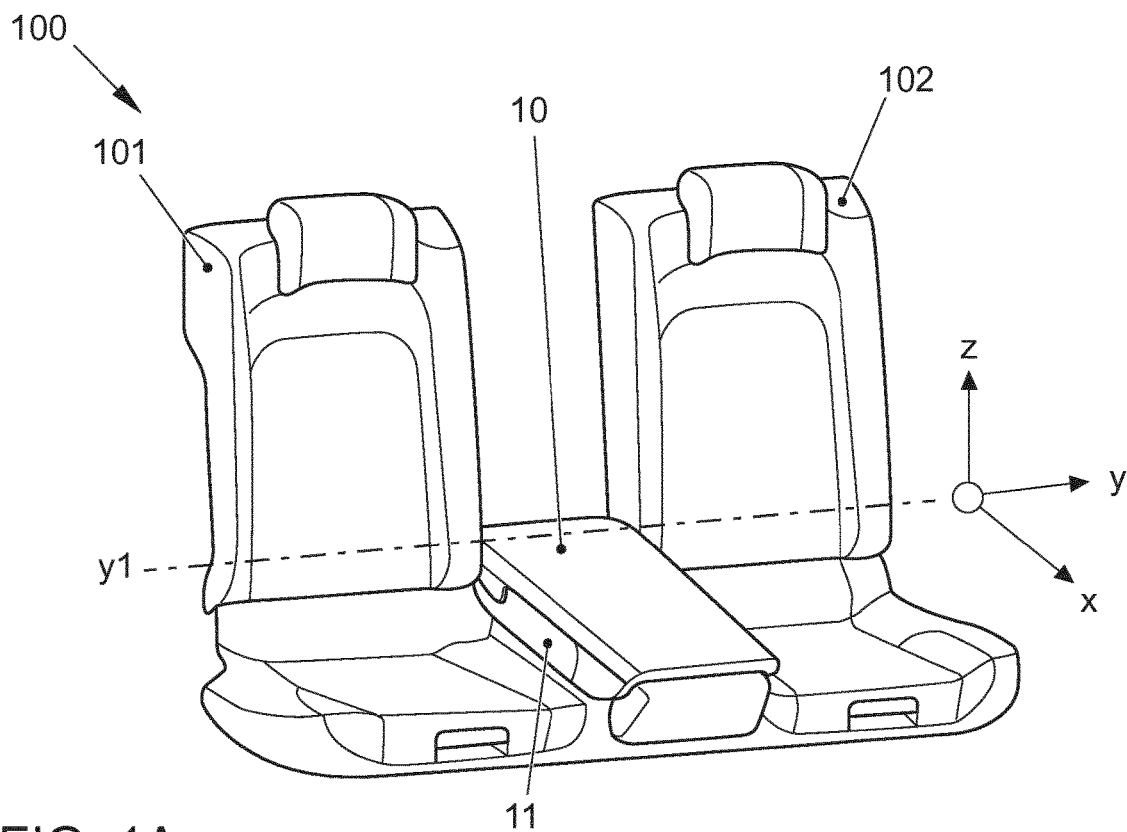
FIG. 1A shows a perspective front view of a back bench seat diagonally across from the front, including a fold-down section folded down onto a seat part of the back bench seat.

A possible design of the invention is explained below in an exemplary embodiment. For the purposes of the description, the direction oriented in the longitudinal direction of a vehicle is to be designated by "x." The direction on the horizontal of the vehicle transverse to the x direction is designated by "y", and the direction in on the vertical of the vehicle transverse to the x direction is designated by "z." This way of designating the spatial directions in terms of Cartesian coordinates corresponds to the coordinate system generally used in the automotive industry.

In the figures, the same reference numerals are used below for the same components, if necessary not all previously introduced components being explained once again on the basis of the reference numerals in each figure.

Figure 1B:
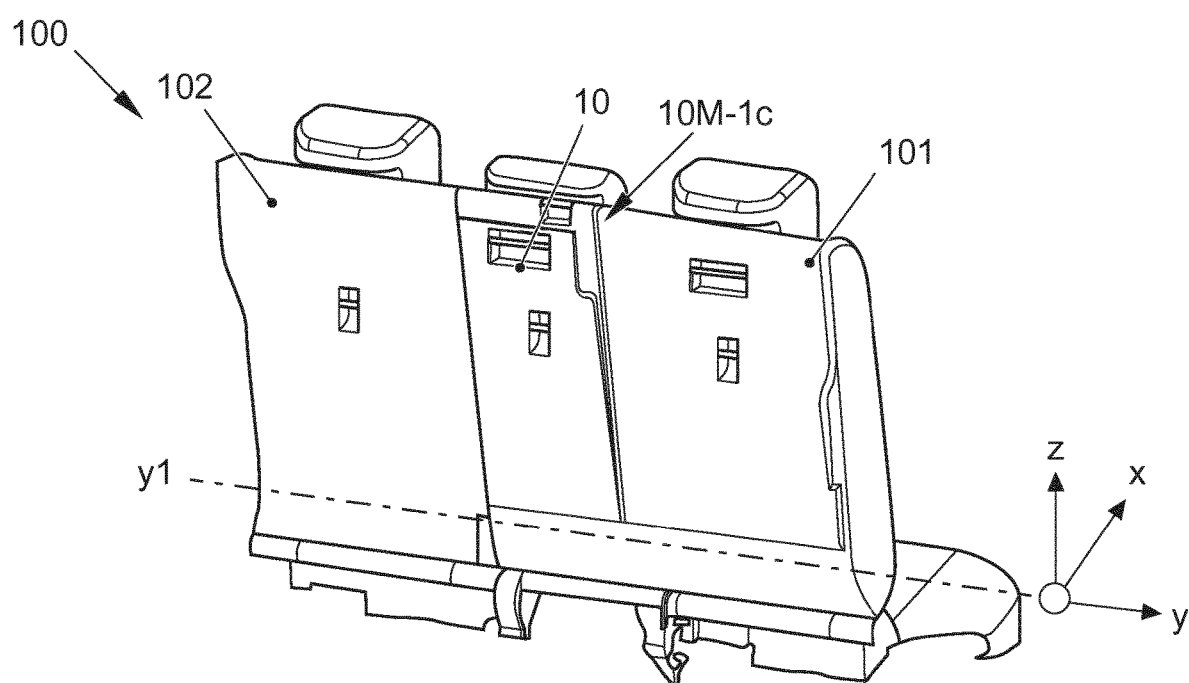
FIG. 1B shows a perspective rear view of a back bench seat diagonally across from the back, including the fold-down section folded up between two backrests of the back bench seat.
Figure 2:
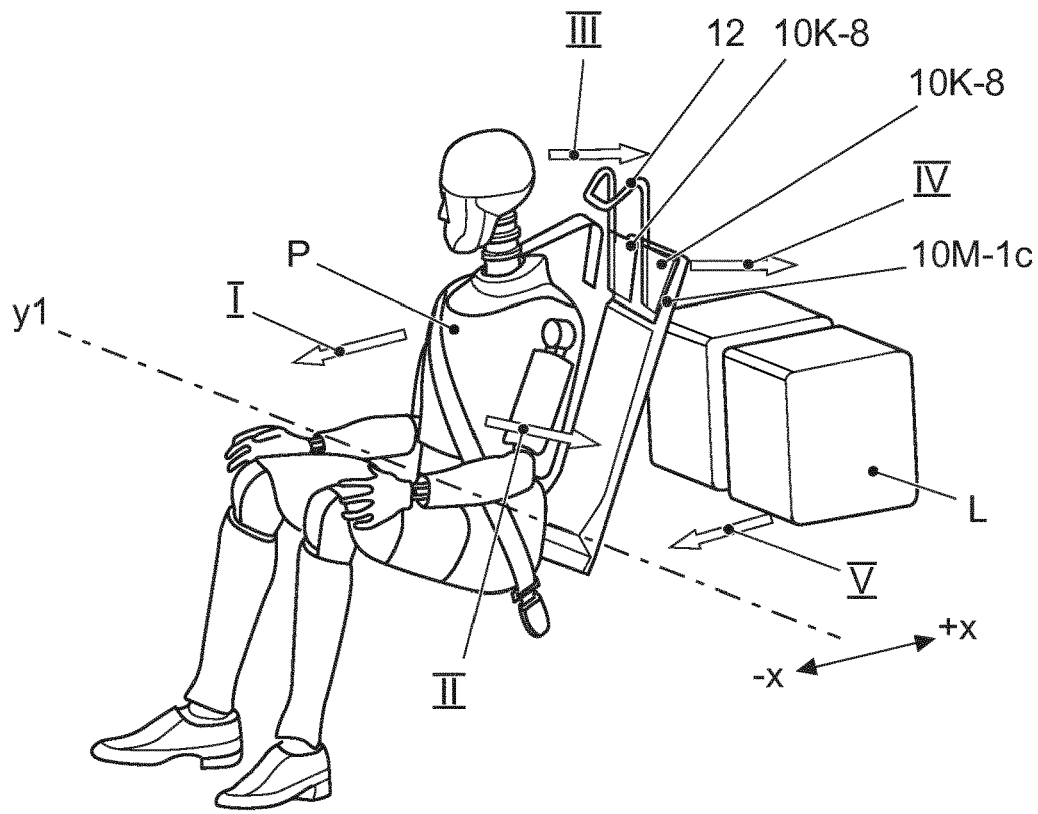
FIG. 2 shows a support structure of the fold-down section without the adjoining components of back bench seat 100 according to FIGS. 1A, 1B.

FIGS. 1 and 2 show a perspective front and rear view of a back bench seat 100, which includes two vehicle seats 101, 102, each having a seat part and a backrest, between which a fold-down section 10 is disposed, which forms a resting surface in the middle of the seat surface of back bench seat 100 in the folded down position (cf. FIG. 1) and forms part of the backrest surface of back bench seat 100 in the folded up position (cf. FIG. 2).

Fold-down section 10 thus represents a reversibly foldable backrest, which has a support structure, which is an example of a subject matter of the present invention. The following explanations thus apply to support structures of backrests of vehicle seats in general.

Fold-down section 10, which is designated more generally below as the support structure, is shown in FIG. 2 without the adjacent components of back bench seat 100 according to FIGS. 1A and 1B to clarify the load cases to be taken into account.

According to the invention, the following procedure is used to ideally distribute the load in support structure 10.

A number of numeric crash analyses are first carried out with/on support structure 10, from which result-dependent load cases are derived, which are symbolized by way of example in FIG. 2, based on force arrows I, II, III, IV, V.

Load cases I through V form a load collective, which is used as a basis in designing hybrid support structure 10. The following load cases are defined: load transfer I during a front-end crash, load transfer II during a rear-end crash, load transfer III during a head impact, load transfer IV during a single-seat test, load transfer V of a cargo L during a front-end crash I.

Load cases I through V, or the load collective, are subsequently calculated in a model in an optimization process, a so-called topology optimization, specifying a certain installation space provided for support structure 10 as a whole in the vehicle, and specifying the provided materials, as well as specifying the maximum permissible component stresses in the multiple components of support structure 10.

It is also taken into account that support structure 10 has a fixed point F on an adjacent, stationary structure, for example an adjacent backrest (cf. FIGS. 1 and 2) and is also movably connected to another adjacent structure (cf. FIGS. 1 and 2) with the aid of corresponding connecting means on a horizontal rotation axis y1.

In other words, in the installation situation, support structure 10 is fastened to the adjacent structure (cf. FIGS. 1 and 2) in its upper area or on its upper end via fixed point F on only one side of the adjacent structure. In its lower area or on its lower end, however, support structure 10 is fixedly connected in the installation situation to another adjacent structure, for example a seat part structure, along horizontal rotation axis y1 running in the y direction.

Taking into account these parameters specific to this exemplary embodiment, the topology optimization according to the object takes place iteratively, a hybrid support structure being sought, which is easy to manufacture and which has a low component weight and sufficient stability matched to the forces acting upon the support structure.

The result of the topology optimization described above results in a support structure 10, which is explained in FIGS. 3 through 8 below.

As a result of the topology optimization, support structure 10 comprises a specific metal structure 10M and a specific plastic structure 10K and thus forms a specific hybrid support structure 10 optimized for the particular application.

Metal structure 10M preferably has a multi-part design and is placed into a mold, after which plastic is introduced into the mold, which joins the components of metal structure 10M in a one-part plastic component having a predefinable structure, which surrounds the component of metal structure 10M. In other words, due to the introduced plastic structure, the multiple components of metal structure 10M are connected to form an assembled part with the aid of plastic, the plastic structure being formed at the same time.

In an alternative embodiment, the option of forming metal structure 10M as a single part generally exists, and to place it into the mold, after which plastic is introduced into the mold, which connects one-part metal structure 10M to the plastic component, it being possible to specify the desired structure for the plastic structure.

Metal Structure 10M of Hybrid Support Structure 10:

It is recommended to first examine FIGS. 3A through 3E and FIGS. 4A and 4B in a combined view, based on which the components of metal structure 10M are explained.

Figure 3A:
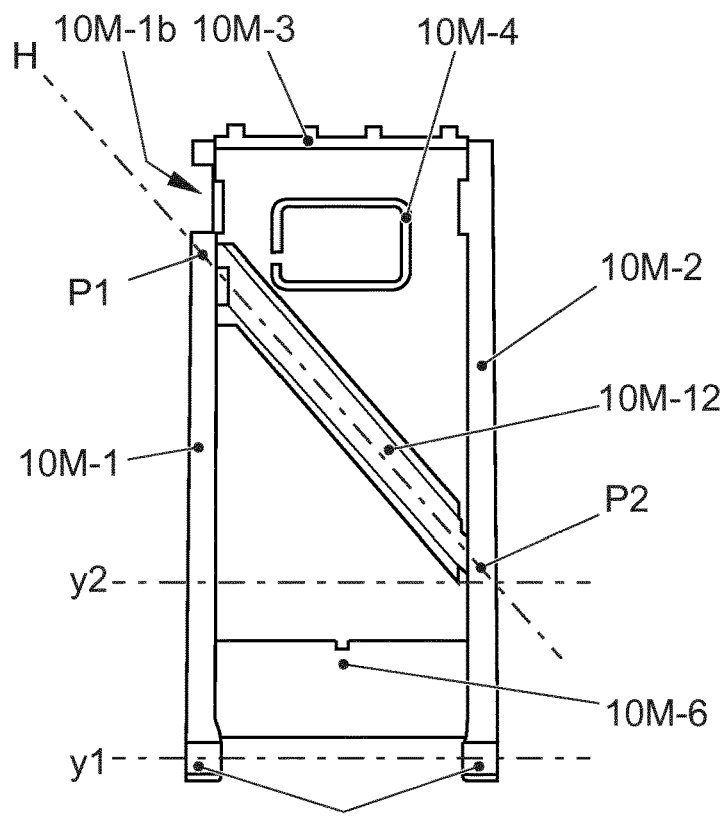
FIG. 3A shows a top view of a metal structure of hybrid support structure 10 according to the invention, made up of the metal structure and the plastic structure.

FIG. 3A shows a top view of metal structure 10M of hybrid support structure 10 according to the invention made up of metal structure 10M and plastic structure 10K.

Metal structure 10M comprises a first side rail profile 10M-1 (left) and a second side rail profile 10M-2 (right), whose longitudinal axes are disposed in the z direction in the installation situation. A lock receiving element 0M-1c is formed in first side rail profile 10M-1, via which metal structure 10M is fixedly connected to the adjacent structure part in the folded-up installation situation (cf. FIG. 1B).

Metal structure 10M further comprises a top profile 10M-3, whose longitudinal axis is disposed transversely at least to side rail profiles 10M-1, 10M-2 in the y direction in the installation situation, which connects side rail profiles 10M-1, 10M-2 to each other in the assembled state.

According to the invention, it was discovered during the topology optimization that a main load line H runs between lock receiving element 10M-1c of first side rail profile 10M-1 and second side rail profile 10M-2 just above a horizontal axis y2 of hybrid support structure 10 ascertained by the topology optimization, so that a connecting profile 10M-12 engages with side rail profiles 10M-1, 10M-2 between connecting points P1 and P2 in the assembled state of hybrid support structure 10.

First connecting point P is situated just below lock receiving element 10M-1c of first side rail profile 10M-1, second connecting point P2 being situated in the lower area at approximately ⅔ the total length of second side rail profile 10M-2 in the vertical longitudinal direction (z direction), viewed from top to bottom, in particular just above horizontal axis y2 ascertained by the topology optimization.

A metallic profile wire 10M-4 is disposed as a function element in the installation space between side rail profiles 10M-1, 10M-2, which is fastened in a base plate 10K-7 made from plastic (cf. FIGS. 5A through 8 above) after hybrid support structure 10 is completed, as is discussed below.

Metallic receiving sleeves 0M-5 are also already provided in metallic side rail profiles 10M-1, 10M-2.

A plate-like insert 10M-6 also belongs to metal structure 10M, which, however, is not disposed for reasons of the stability of metallic support structure 10M but instead performs a safety function with respect to cargo L striking metal structure 10M (cf. FIG. 2) with respect to a front-end crash load case V.

Figure 3B:
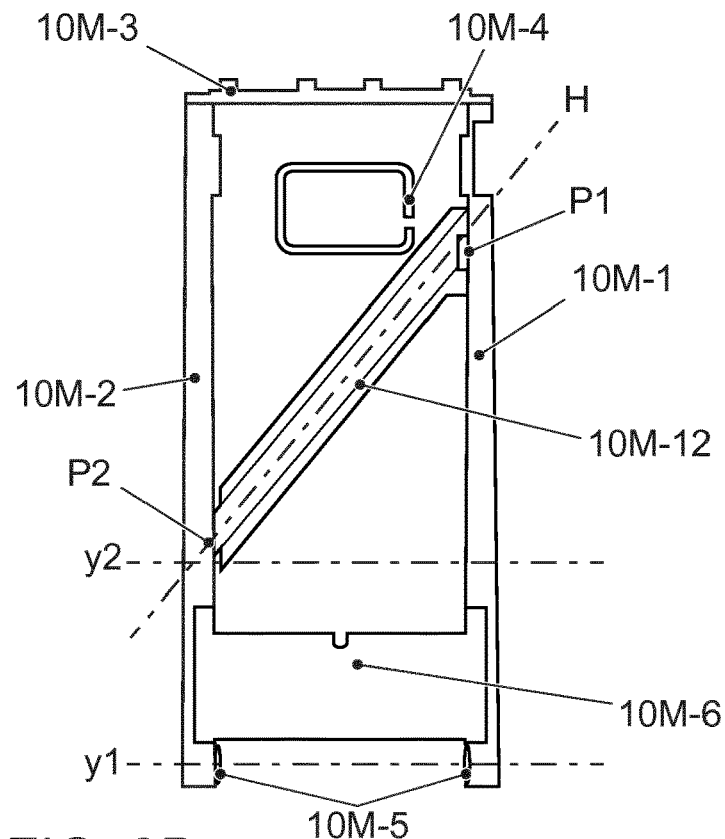
FIG. 3B shows a rear view of the metal structure, the metal structure being rotated 180° around an imaginary vertical rotation axis with respect to FIG. 3A.

FIG. 3B shows a rear view of the metal structure, metal structure 20M being rotated 180° around an imaginary vertical rotation axis with respect to FIG. 3A.

Figures 3C, 3D:
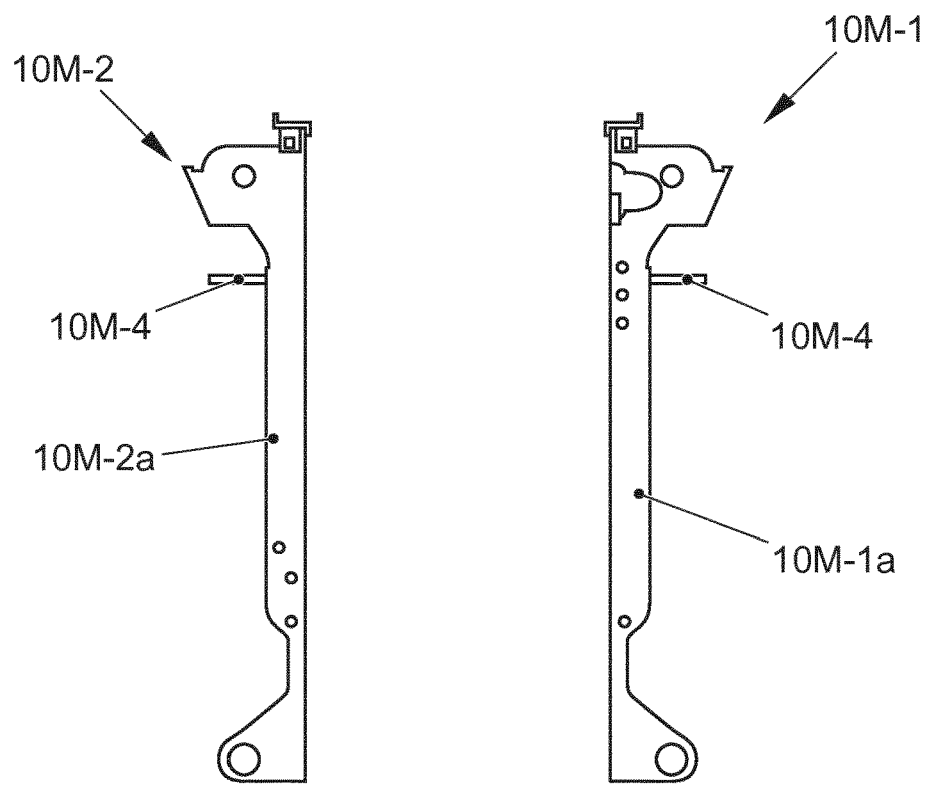
FIG. 3C shows a side view of metal structure 10M, the metal structure being rotated 90° to the left around the imaginary vertical rotation axis with respect to FIG. 3A.
FIG. 3D shows a side view of metal structure 10M, the metal structure being rotated 90° to the right around the imaginary vertical rotation axis with respect to FIG. 3A.

FIG. 3C shows a side view of metal structure 10M, metal structure 10M being rotated 90° to the left around the imaginary vertical rotation axis with respect to FIG. 3A.

Second metallic side rail 10M-2 is designed as a C profile and has two opposite profile legs 10M-2a, which extend in the y direction in the installation situation of metal structure 10M in the vehicle, only one of opposite profile legs 10M-2a being visible in FIG. 3C. Profile legs 10M-2a extend to the side of second metallic side rail 10M-2 in the extension of spanned y/x plane between side rails 10M-1, 10M-2.

FIG. 3D shows a side view of metal structure 10M, metal structure 10M being rotated 90° to the right around the imaginary vertical rotation axis with respect to FIG. 3A.

First side rail 10M-1 is also designed as a C profile and has two opposite profile legs 10M-1a, which extend in the y direction on metal structure 10 in the installation situation, only one of opposite profile legs 10M-1a being again visible in FIG. 3D. Profile legs 10M-1a extend to the side of first metallic side rail 10M-1 in the extension of spanned y/x plane between side rails 10M-1, 10M-2.

In the case of forces acting in the +/−x direction (cf. FIG. 2), side rail profiles 10M-1, 10M-2 having profile legs 10M-1a, 10M-2a extending in the y direction in the installation situation advantageously have a high stability according to load cases I through V. Compared to profile legs 10M-1a, 10M-2a extending in the x direction, the effectively usable geometrical moment of inertial in the case of forces acting in the +/−x direction (cf. FIG. 2) is significantly increased by an arrangement of profile legs 10M-1a, 10M-2a in the y direction (transverse to the x direction).

Figure 3E:
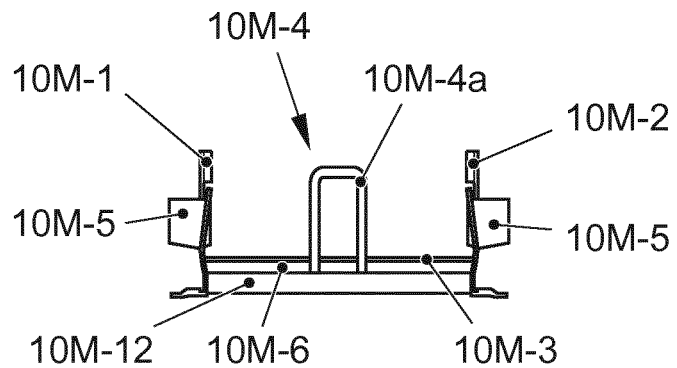
FIG. 3E shows a view from below of the metal structure, a top profile of the metal structure being rotated 90° around an imaginary horizontal rotation axis with respect to FIG. 3A into the page plane.

FIG. 3E shows metal structure 10M in a view from below, top profile 10M-3 of metal structure 10M being rotated 90° around an imaginary horizontal rotation axis with respect to FIG. 3A into the page plane, so that the viewer is looking at metal structure 10 from below. In this representation, insert 10M-6, connecting profile 10M-12 and top profile 10M-3 are visible.

Figure 3F:
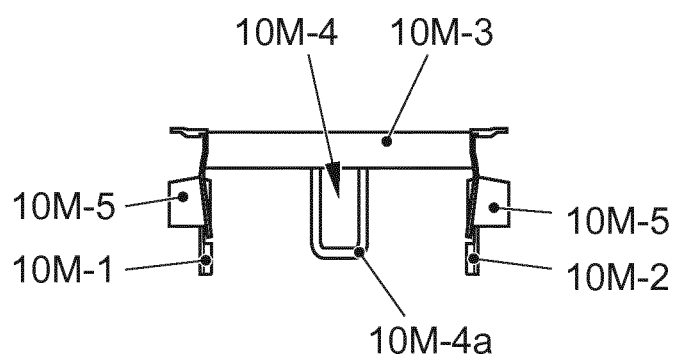
FIG. 3F shows a top view of the metal structure, the top profile of the metal structure being rotated 90° around an imaginary horizontal rotation axis with respect to FIG. 3A out of the page plane.

FIG. 3F shows a top view of metal structure 10M, top profile 10M-3 of metal structure 10M being rotated 90° around an imaginary horizontal rotation axis with respect to FIG. 3A out of the plane of the page, so that the viewer is looking at metal structure 10 from above.

In this representation according to FIG. 3F, top profile 10M-3 covers both connecting profile 10M-12 and plate-like insert 10M-6, so that only projection 10M-4a of profile wire 10M-4 visible in FIGS. 3C, 3D is also visible.

Cushion structure receiving elements 10K-41 (cf. FIGS. 5A through 8) are also illustrated, which are used for the engagement of cushion structure 11, which is disposed on hybrid support structure 10 and illustrated only in FIG. 1A, in the assembled state of hybrid support structure 10.

Figure 4A:
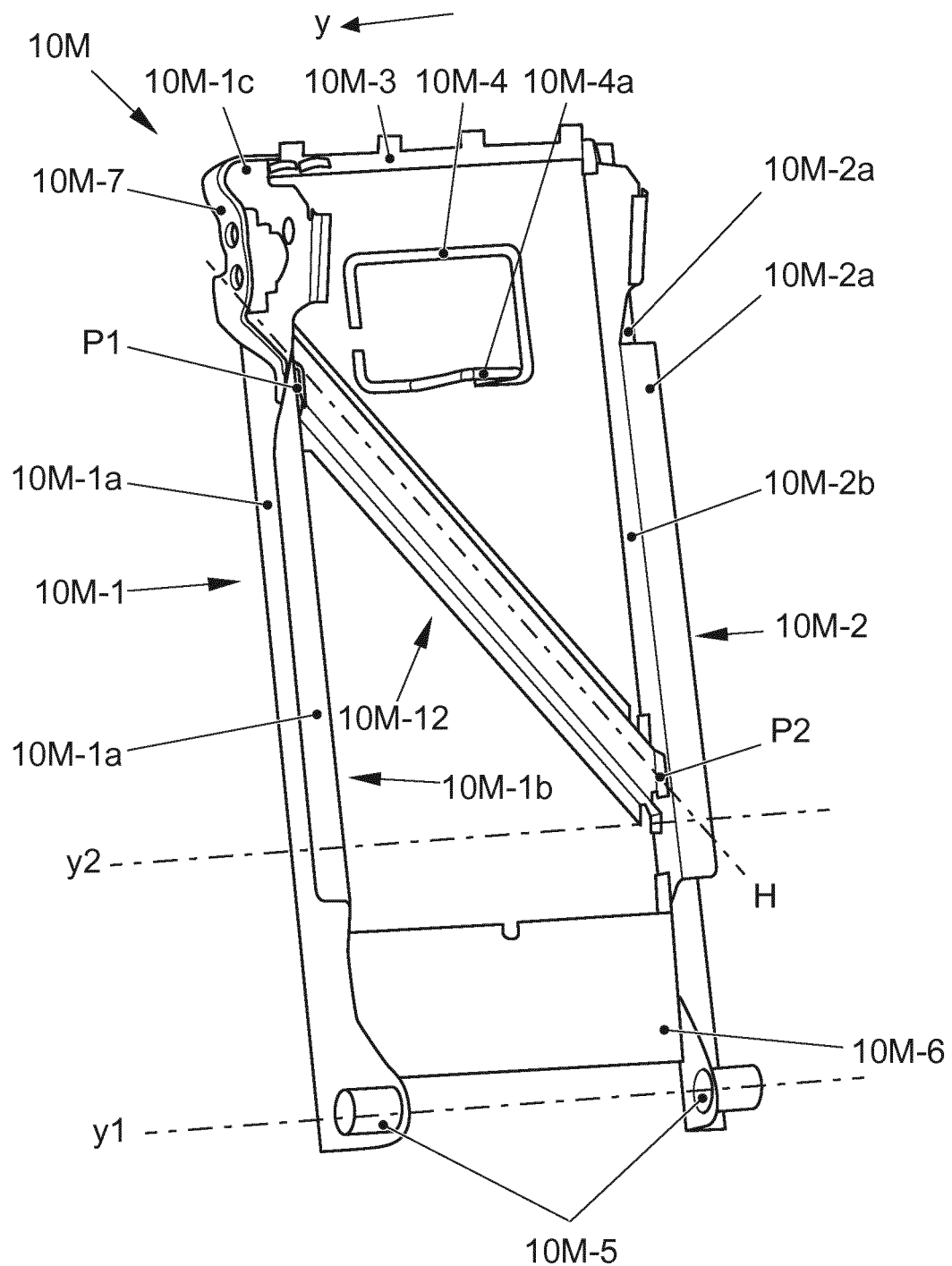
FIG. 4A shows a perspective front view of the metal structure according to FIG. 3A.
Figure 4B:
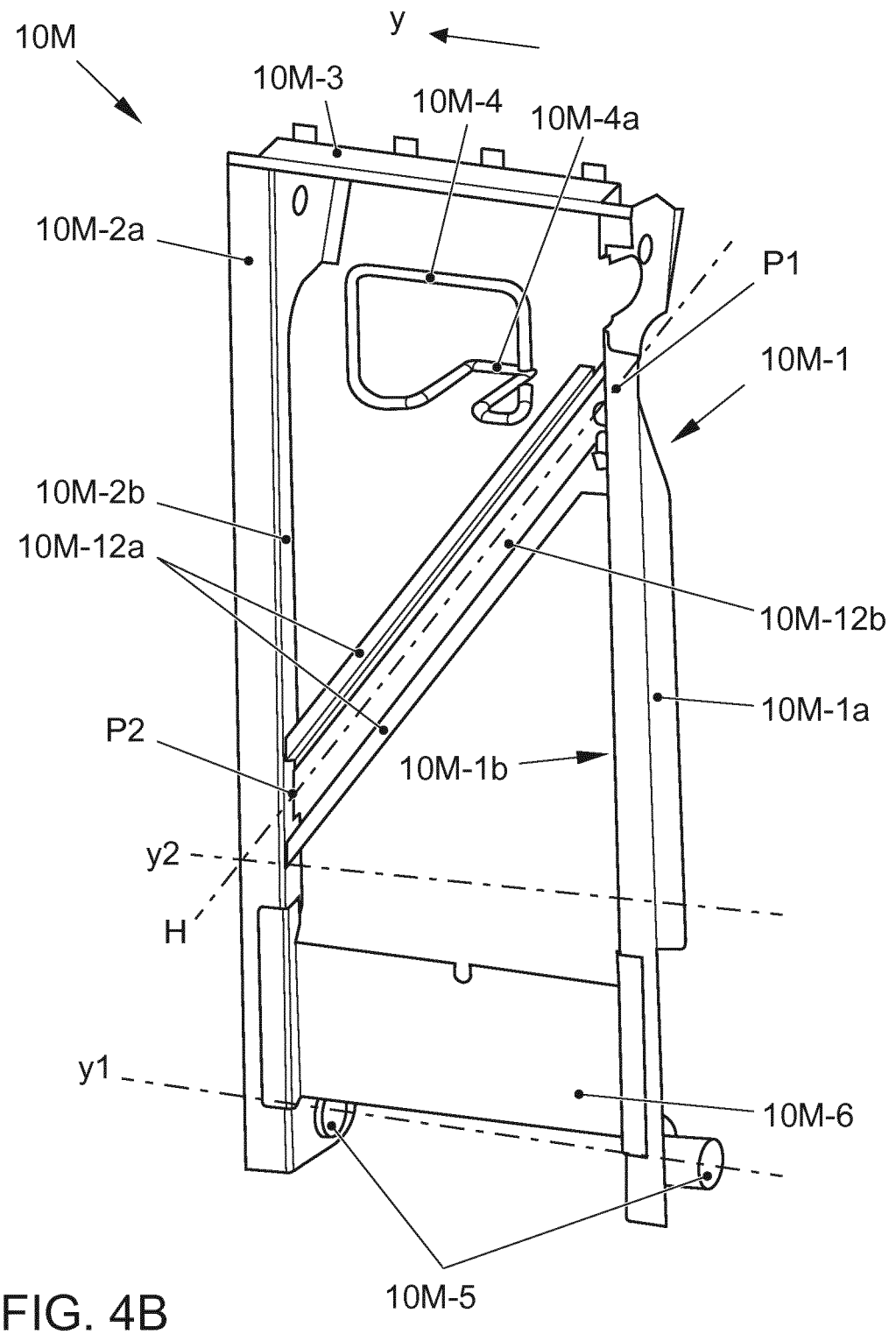
FIG. 4B shows a perspective rear view of the metal structure according to FIG. 3B.

FIGS. 4A and 4B show perspective representations of the described components having the same reference numerals, a front view similar to FIG. 3A being illustrated in FIG. 4A, and a rear view similar to FIG. 3B being illustrated in FIG. 4B.

It is particularly clear here that side rails 10M-1, 10M-2 are designed as C profiles, whose opposite profile legs 10M-1a, 10M-2a of metal structure 10M extend in the y direction in the installation situation, both opposite profile legs 10M-2a being visible in FIG. 4A.

The fact that lock receiving element 10M-1c of first side rail profile 10M-1 is completed by a holding element 10M-7 is also shown, whereby an installation space forms between lock receiving element 10M-1c and holding element 10M-7, in which a lock (not illustrated) is accommodated after a corresponding completion of rear bench seat 100.

It is also made visible in FIGS. 4A and 4B that connecting profile 10M-12 disposed between side rail profiles 10M-1, 10M-2 is also designed as a C profile, which also has two opposite profile legs 10M-12a, which extend in the x direction in the installation situation of metal structure 10M in the vehicle. In the case of forces acting in the +/−x direction (cf.

FIG. 2), this design is also advantageous with respect to increasing the stability of support structure 10 according to load cases I through V.

FIGS. 4A and 4B also show that openings, whose importance is discussed below, are formed in insert 10M-6 and in base parts 10M-1b, 10M-2b of side rail profiles 10M-1, 10M-2 disposed between opposite profile legs 10M-1a, 10M-2a as well as in base part 10M-12b of connecting profile 10M-12 between opposite profile legs 10M-12A.

In addition, a hollow space is formed in each case between of the two opposite profile legs 10M-1a, 10M-2a of side rail profiles 10M-1, 10M-2 and the two opposite profiles legs 10M-12a of connecting profile 10M-12, which may be provided with a plastic structure 10K-2 (cf. FIG. 5B above), as explained in detail below.

Finally, it is also clear in FIGS. 4A and 4B that the components are designed in such a way that the joints have a form-fitting design, such that the components may be disposed in a true position in a plastic mold.

Plastic structure 10K of hybrid support structure 10:

It is recommended to examine FIGS. 5A through 5E and FIGS. 6, 7A, 7B and 8 in a combined view, based on which plastic structure 10K and metal structure 10M and the relationships between aforementioned structures 10M, 10K are explained.

As explained above, plastic structure 10K is created as a single part in a mold by means of injection molding. A thermoplastic material, in particular a fiber-reinforced thermoplastic material, is preferably used as the plastic. A high specific rigidity of plastic structure 10K may be advantageously achieved by this manufacturing process with a geometric design freedom.

The very good geometric design freedom makes it possible, firstly to form the joining zones crucial for the force transmission between metal components 10M-1, 10M-2, 10M-3, 10M-4, 10M-5, 10M-6, 10M-7 of metal structure 10M and plastic structure 10K, it being secondly possible, due to the good geometric design freedom, to ensure a specific matching at single points or in areas of plastic structure 10F in and of itself with respect to strength as a function of the force transmission desired via plastic structure 10K.

In its own right, metal structure 10M is already characterized by a high energy absorption capacity, i.e. it is characterized by high strength and good energy dissipation properties.

Plastic structure 10K adds to the very good strength properties of metal structure 10M in a targeted manner, at a low weight of plastic structure 10K, plastic structure 10K and metal structure 10M each being provided with a load path-optimized design in their own right and also being matched to each other and advantageously combined with each other in a load path-optimized manner, as discussed below.

Figure 5A:
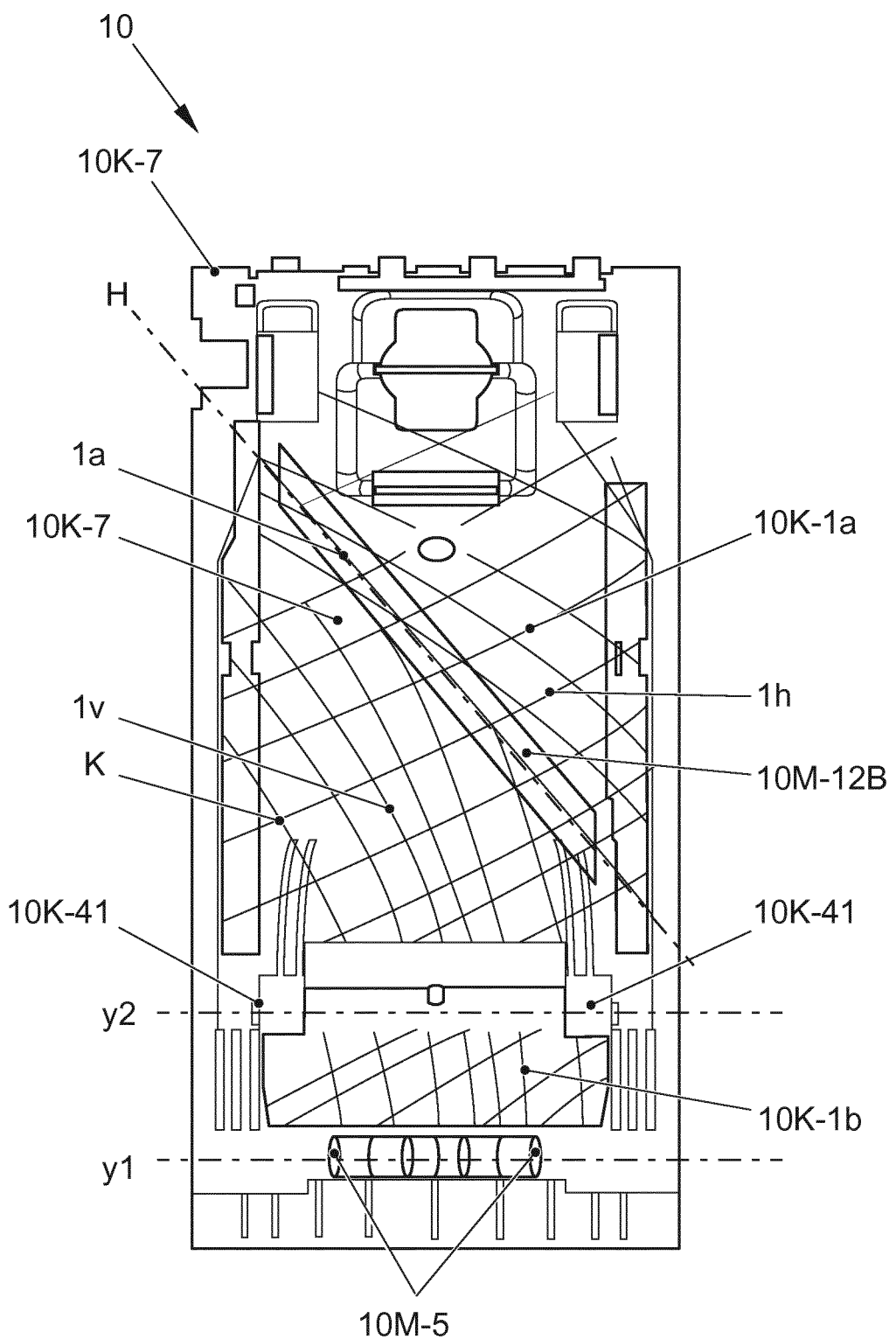
FIG. 5A shows a top view of the hybrid support structure made up of the metal structure and the plastic structure.
Figure 7A:
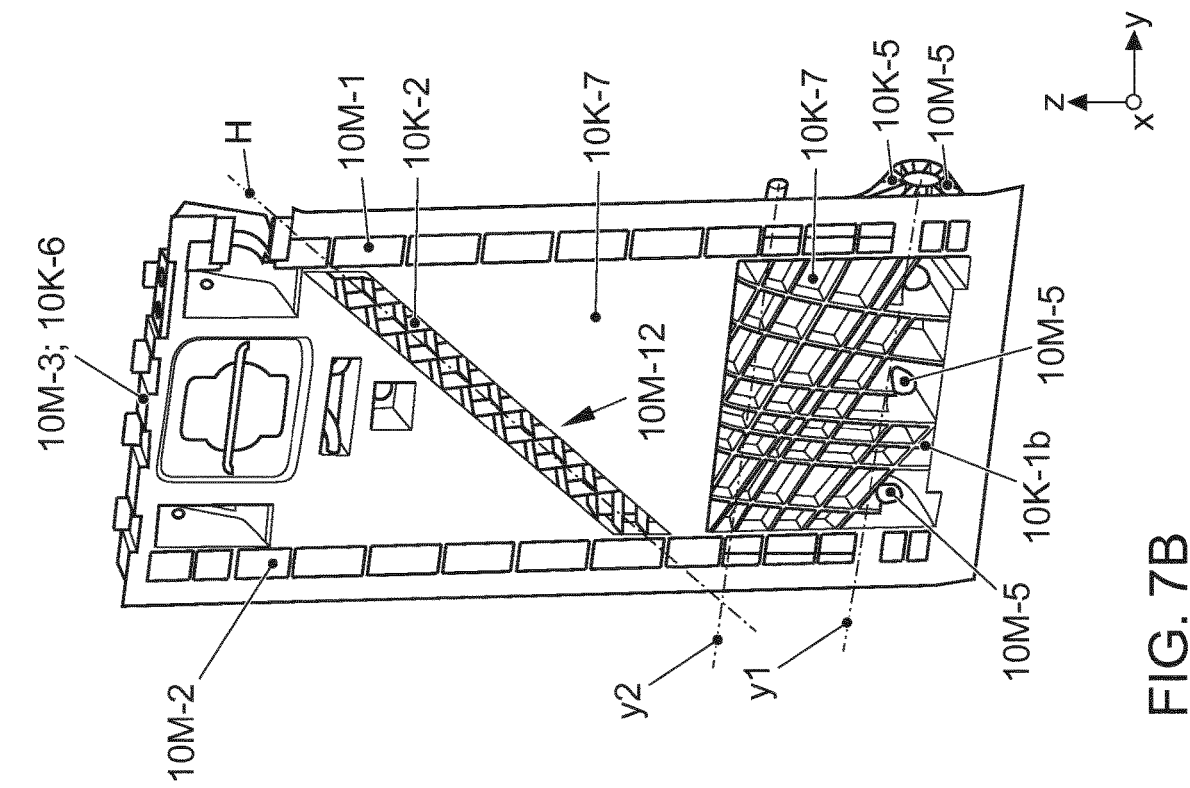
FIG. 7A shows a perspective front view of the hybrid support structure according to FIG. 5A.
Figure 7B:
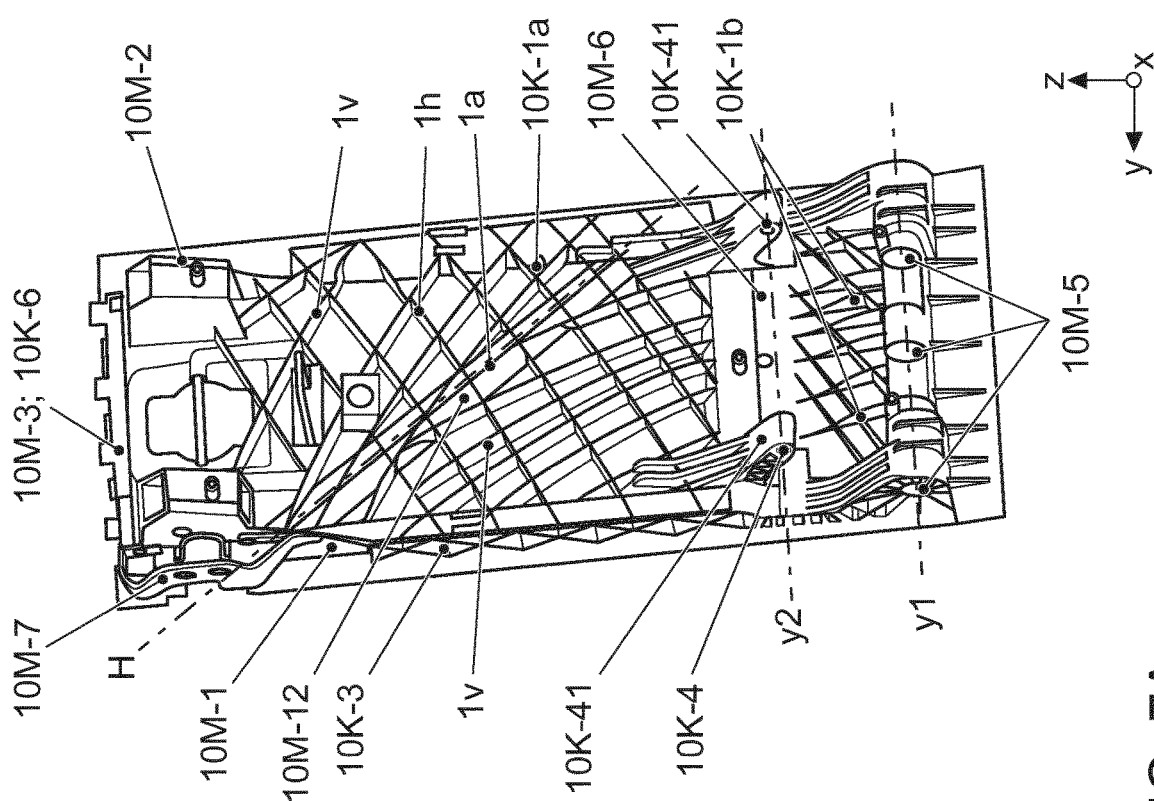
FIG. 7B shows a perspective rear view of the hybrid support structure according to FIG. 5B, the hybrid support structure being rotated 180° around an imaginary vertical rotation axis with respect to FIG. 7A.
Figure 8:
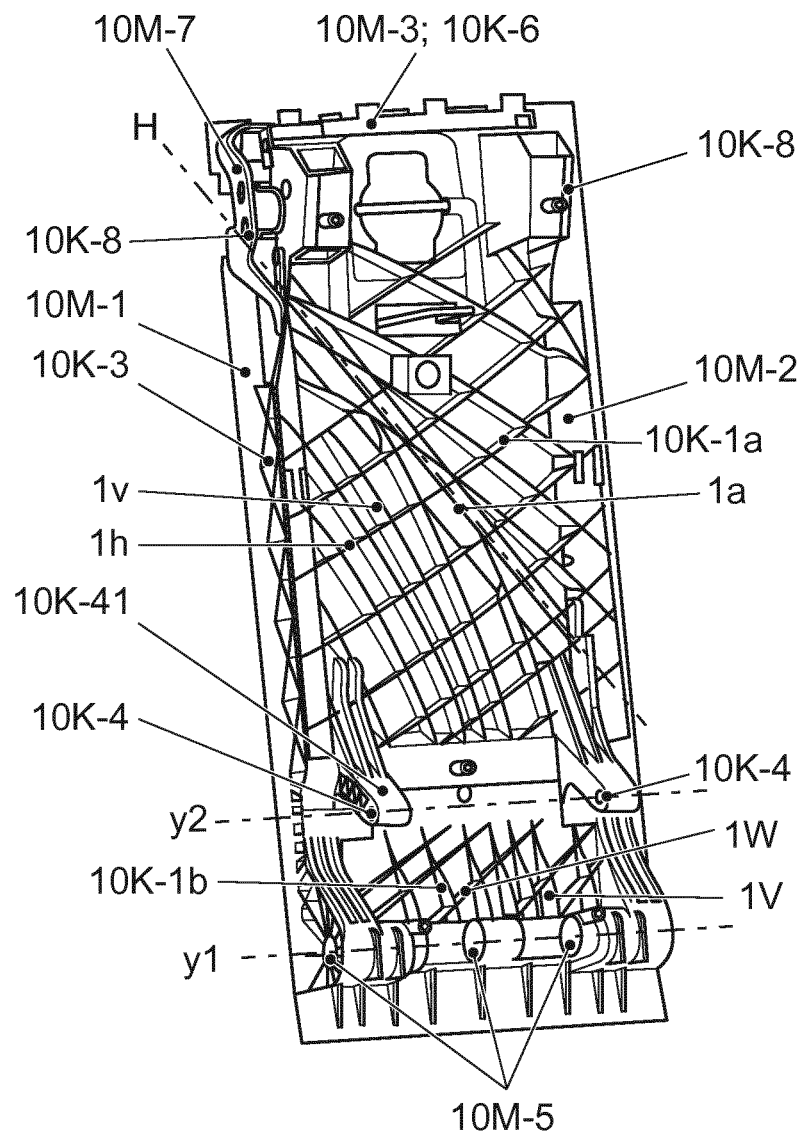
FIG. 8 shows the hybrid support structure according to FIG. 7A in an enlarged perspective front view.

FIGS. 5A, 7A and FIG. 8 (enlarged representation) show hybrid support structure 10 as a plastic structure 10K, including integrated metal structure 10M (similar to FIG. 3A) in a perspective front view, looking obliquely from above onto the front side of hybrid support structure 10.

Figure 5B:
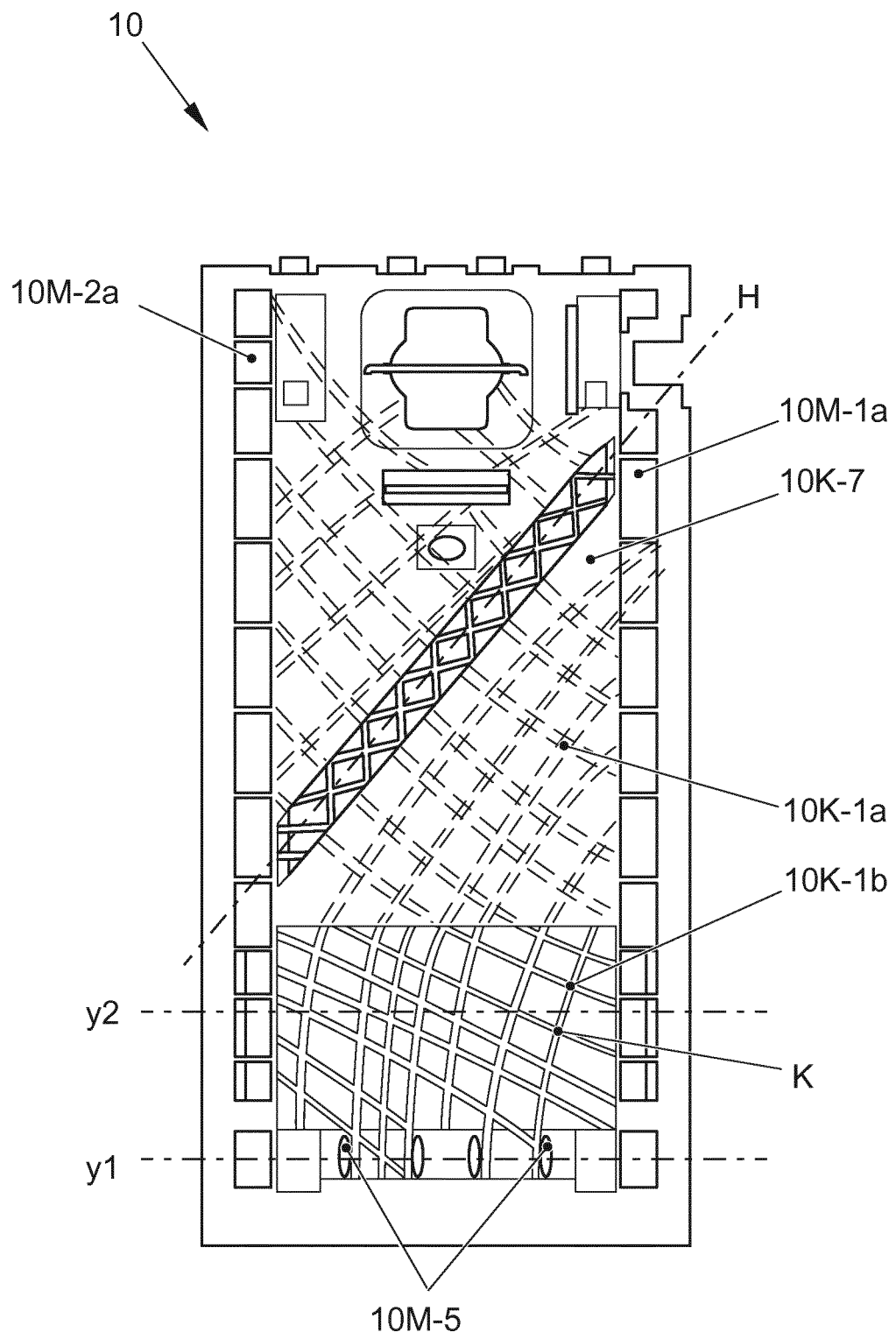
FIG. 5B shows a rear view of the hybrid support structure, the hybrid support structure being rotated 180° around an imaginary vertical rotation axis with respect to FIG. 5A.

FIG. 5B shows a rear view of plastic structure 10K, including integrated metal structure 10M (similar to FIG. 3B), hybrid support structure 10 being rotated 180° around an imaginary vertical rotation axis.

According to the invention, one-part plastic structure 10K comprises multiple areas.

First Area:

A first area of plastic structure 10K is designed as a web structure, in particular as spiderweb structure 10K-1 between side rail profiles 10M-1, 10M-2, the spanned plane of spiderweb structure 10K-1 extending in the y direction in the installation situation of hybrid support structure 10 in the vehicle. Viewed in the z direction, spiderweb structure 10K-1 extends between headrest receptacles 10K-8 belonging to plastic structure 10K (cf. FIG. 2) up to horizontal rotation axis y1 of support structure 10.

Spiderweb structure 10K-1 is formed in an interrupted manner on the front side according to FIG. 5A, while it is continuously formed on the back side according to the rear view in FIG. 5B.

On the front side and on the back side, spiderweb structure 10K-1 forms a first spiderweb substructure 10K-1a and a second spiderweb substructure 10K-1b.

Within the plane spanned by second spiderweb substructure 10K-1b, metallic insert 10M-6 is disposed between lateral side rail profiles 10M-1, 10M-2 and divides second spiderweb substructure 10K-1b into a front-side and a back-side spiderweb substructure 10K-1b, viewed in the x direction in the installation situation.

Second spiderweb substructure 10K-1 is thus situated on the side (front side) of metallic insert 10M-6 of hybrid support structure 10 facing the occupant in the installation situation as well as on the side (back side) of metallic insert 10M-6 of hybrid support structure 10 facing away from the occupant.

An interruption is formed between spiderweb substructures 10K-1a, 10K-1b in the installation situation, viewed in the z direction, since the installation space between substructures 10K-1a, 10K-1b is needed for fastening cushion structure 11 disposed on hybrid support structure 10 (cf. FIG. 11), whose structure rests in the installation space of hybrid support structure 10 in the assembled state.

In other words, spiderweb structure 10K-1 of plastic structure 10K includes first and second spiderweb substructures 10K-1a, 10K-1b, which are formed continuously on the back side of hybrid support structure 10 and in an interrupted manner on a front side of hybrid support structure 10.

A spanned plane of first spiderweb substructure 10K-1a extends between lateral side rail profiles 10M-1, 10M-2 of the hybrid support structure and between headrest receptacles 10K-8 belonging to plastic structure 10K on an upper end of hybrid support structure 10 up to a horizontal axis y2 between the upper and lower ends of hybrid support structure 10, while within the plane spanned by second spiderweb substructure 10K-1b, metallic insert 10M-6 is disposed between lateral side rail profiles 10M-1, 10M-2 and divides second spiderweb substructure 10K-1b into a front-side and a back-side second spiderweb substructure 10K-1b.

First spiderweb substructure 10K-1a comprises a central rib 1a, which follows main load line H.

According to the invention, it was discovered during the topology optimization that main load line H runs between lock receiving element 10M-1c of first side rail profile 10M-1 and second side rail profile 10M-2 just above horizontal axis y2, ascertained by the topology optimization, which runs in parallel above horizontal rotation axis y1, so that connecting profile 10M-12 engages with side rail profiles 10M-1, 10M-2 between connecting points P1 and P2 already defined in the assembled state.

Central rib 1a thus also begins just below lock receiving element 10M-1c of first side rail profile 10M-1 (similar to first connecting point P1) and ends at second side rail profile 10M-2 just above horizontal axis y2 ascertained by the topology optimization (similar to second connecting point P2), whereby the desired high stability of hybrid support structure 10 and low weight are possible due to a combined arrangement of central rib 1a made from plastic and connecting profile 10M-12 made from metal.

The material thicknesses of metallic side rail profiles 10M-1, 10M-2 and metallic connecting profile 10M-12 may be advantageously reduced accordingly, whereby the overall weight of hybrid support structure 10 decreases.

However, to also achieve a sufficient stability in a crash case, central rib 1a is also part of illustrated spiderweb structure 10K-1, which is formed on the front side of insert 10M-6 as first spiderweb substructure 10K-1a and second spiderweb substructure 10K-1b and is formed on the back side of insert 10M-6 as continuous spiderweb structure 10K-1 from the two spiderweb substructures 10K-1a and 10K-1b without an interruption, as is made clear in FIG. 5B. In the rear view according to FIG. 5B, first spiderweb substructure 10K-1a is covered by base plate 10K-7 formed from plastic.

In the front view according to FIG. 5A as well as in the back view according to FIG. 5B, it is clear that essentially vertically oriented ribs 1v projecting in a semicircular manner from central rib 1a and essentially horizontal oriented ribs 1h are disposed, which cross each other throughout and which form illustrated irregular spiderweb-typical structure 10K-1. In particular, essentially vertically oriented ribs 1v follow central rib 1a in a semicircular manner, since the main load path was determined along main load line H by the topology optimization.

Another special feature is that central rib 1a runs along base part 10M-12b of connecting profile 10M-12, whereby little installation space is available to central rib 1a between side rail profiles 10M-1, 10M-2. As a result, central rib 1a and all essentially vertically oriented ribs 1v and essentially horizontally oriented ribs 1h running along base part 10M-12b have smaller depths, viewed in the x direction.

Essentially vertically oriented ribs 1v and essentially horizontally oriented ribs h disposed outside connecting profile 10M-12 have a depth, viewed in the x direction, which essentially corresponds to the depth of base parts 10M-b, 10M-2b of side rail profiles 10M-1, 10M-2.

In the area of insert 10M-6, part of second spiderweb substructure 10K-1b is disposed in front of metallic insert 10M-6 in a manner facing the occupant, and another part of second spiderweb substructure 10K-1b is disposed behind metallic insert 10M-6 in a manner facing away from the occupant or facing cargo L, so that essentially vertically oriented ribs 1v and essentially horizontally oriented ribs 1h have a depth which, in each case, corresponds to half the depth of base parts 10M-1b, 10M-2B of side rail profiles 10M-1, 10M-2, minus half the installation depth of metallic insert 10M-6.

Second Area:

A second area (cf. FIG. 5B) of plastic structure 10K is also designed as a web structure, in particular as a cross web structure 10K-2. Cross web structure 10K-2 is formed between profile legs 10M-12a of connecting profile 10M-12, the spanned plane of cross web structure 10M-2 extending in the y direction in the installation situation of hybrid support structure 10 in the vehicle. Cross web structure 10K-2 is formed from regularly crossing ribs, which in the illustrated exemplary embodiment form essentially square honeycombs.

Figures 5C, 5D:
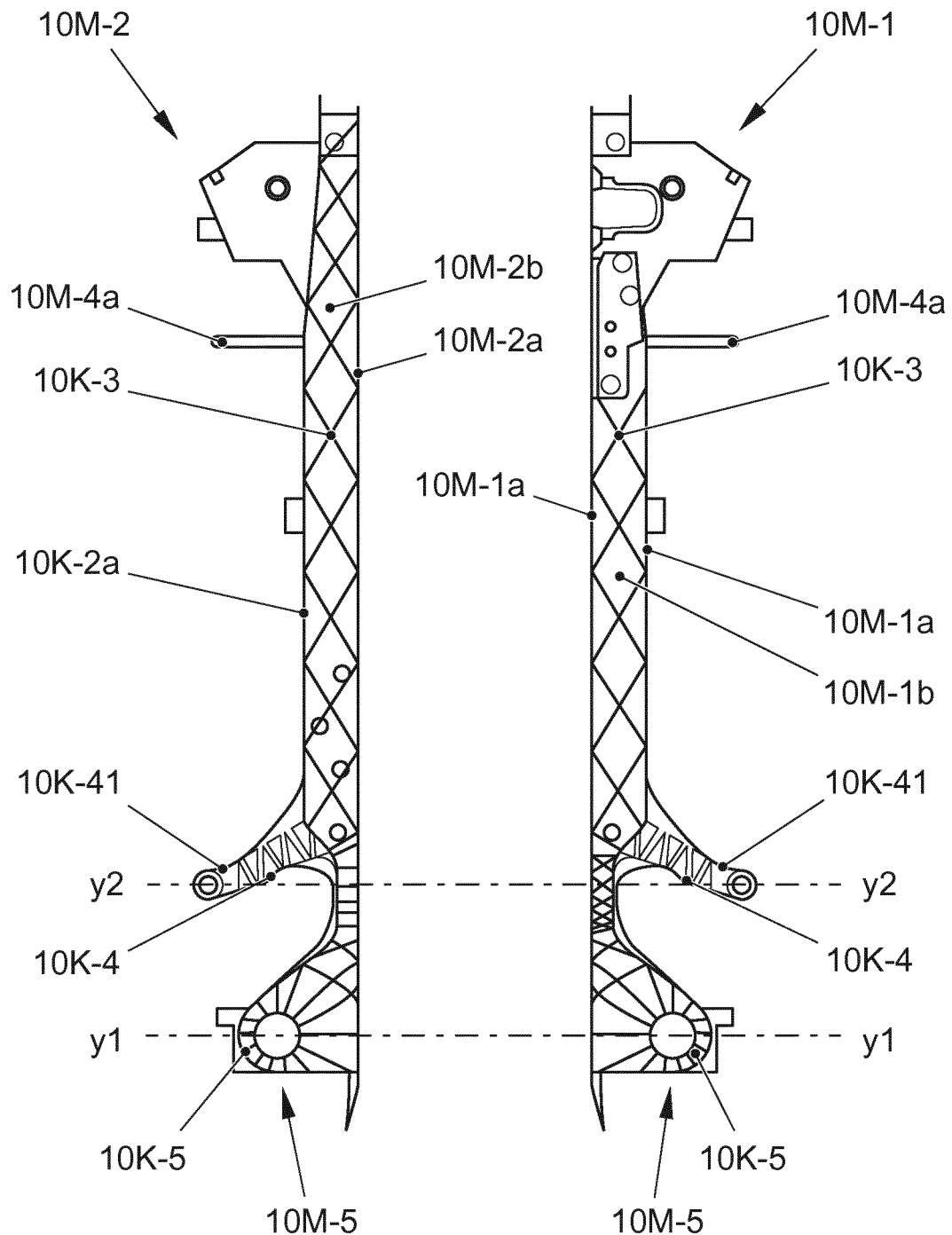
FIG. 5C shows a side view of the hybrid support structure, the hybrid support structure being rotated 90° to the left around the imaginary vertical rotation axis with respect to FIG. 5A.
FIG. 5D shows a side view of the hybrid support structure, the hybrid support structure being rotated 90° to the right around the imaginary vertical rotation axis with respect to FIG. 5A.

FIG. 5C shows a side view of plastic structure 10K, including integrated metal structure 10M (similar to FIG. 3C), hybrid support structure 10 being rotated 90° to the left around an imaginary vertical rotation axis.

FIG. 5D shows a side view of plastic structure 10K, including integrated metal structure 10M (similar to FIG. 3D), hybrid support structure 10M being rotated 90° to the right around an imaginary vertical rotation axis.

Third Area:

A third area (cf. FIG. 5C) of plastic structure 10K is also designed as a web structure, in particular as another cross web structure 10K-3 between profile legs 10M-1a, 10M2a of side rail profiles 10M-1, 10M-2, the spanned planes of additional cross web structures 10K-3 extending in the x direction in the installation situation of hybrid support structure 10 in the vehicle. Additional cross web structures 10K-3 are formed from regularly crossing ribs, which in the illustrated exemplary embodiment form essentially rhombic honeycombs.

In order for spiderweb structures 10K-1 to connect to described cross web structures 10K-2, 10K-3 on the plastic side, openings are formed in insert 10M-6 and in base parts 10M-1b, 10M-2b of side rail profiles 10M-1, 10M-2 disposed between opposite profile legs 10M-1a, 10M-2a as well as in base part 10M-12b of connecting profile 10M-12 formed between opposite profile legs 10M-12A of connecting profile 10M-12.

According to the invention, it is provided that plastic flows through the present openings during the manufacture of hybrid support structure 10, whereby aforementioned metallic components 10M-6, 10M-1, 10M-2 and 10M-12 are advantageously connected to each other via web structures 10K-1, 10K-2, 10K-3 in addition to the joints connected with the aid of plastic.

Additional plastic structural areas are formed according to the invention.

Fourth Area:

A fourth area of plastic structure 10K relates to the formation of cushion structure receiving element 10K-41 with a triangular web structure 10K-4, which is illustrated as an example and extends in the x direction in the installation situation of hybrid support structure 10 in the vehicle, so that triangular web structure 10K-4 disposed on the side extends in the x direction. Triangular web structure 10K-4 is formed from regularly angled ribs, which form essentially triangular honeycombs. Hybrid support structure 10 thus encompasses cushion structure receiving elements 10K-41 made from plastic and provided with stabilizing triangular web structure 10K-4, in which cushion structure 11 is accommodated on one end and is engaged with hybrid structure 10 via projection 10M-4a of metallic profile wire 10M-4 on the other end.

Fifth Area:

A fifth area relates to the formation of the extrusion coating of receiving element 10K-5 with a circular segment web structure 10K-5, illustrated as an example, which extends in the x direction in the installation situation of hybrid support structure 10 in the vehicle, so that web structure 10K-5 disposed on the side also extends in the x direction. Circular segment web structure 10K-5 is formed from ribs projecting regularly in a ray-shaped manner from receiving sleeves 10M-5, which form essentially circular segment-shaped honeycombs. It is also clear in FIG. 5B that the extrusion coating situated within second spiderweb substructure 10K-1b of spiderweb structure 10K-1 is led up to receiving sleeves 10M-5 extrusion-coated with plastic on the side facing away from the occupant.

FIG. 3E shows plastic structure 10K, including integrated metal structure 10M (similar to FIG. 3E) in a view from below, top profile 10M-3 of metal structure 10M being rotated 90° around an imaginary horizontal rotation axis into the page plane, so that the viewer is looking at hybrid support structure 10 from below.

Figure 5E:
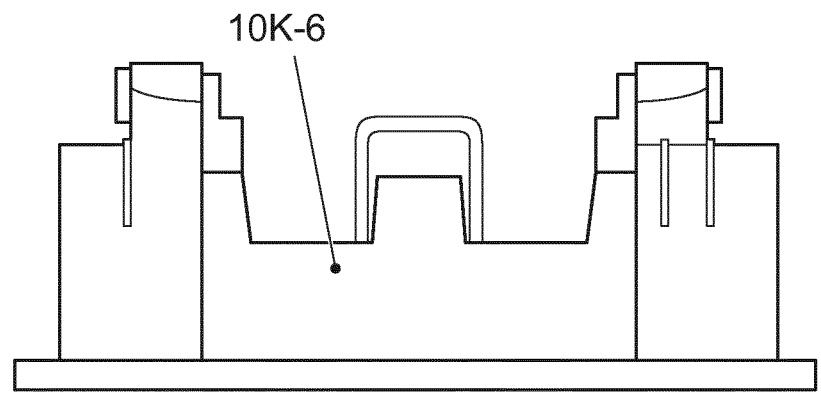
FIG. 5E shows a view from below of the hybrid support structure, the top profile of the hybrid support structure being rotated 90° around an imaginary horizontal rotation axis with respect to FIG. 5A into the page plane.
Figure 5F:
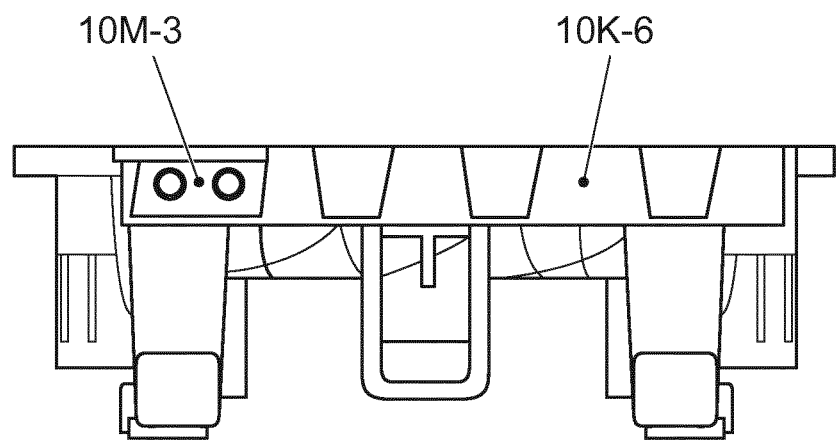
FIG. 5F shows a top view of the hybrid support structure, the top profile of the hybrid support structure being rotated 90° around an imaginary horizontal rotation axis with respect to FIG. 5A out of the page plane.
Figure 6:
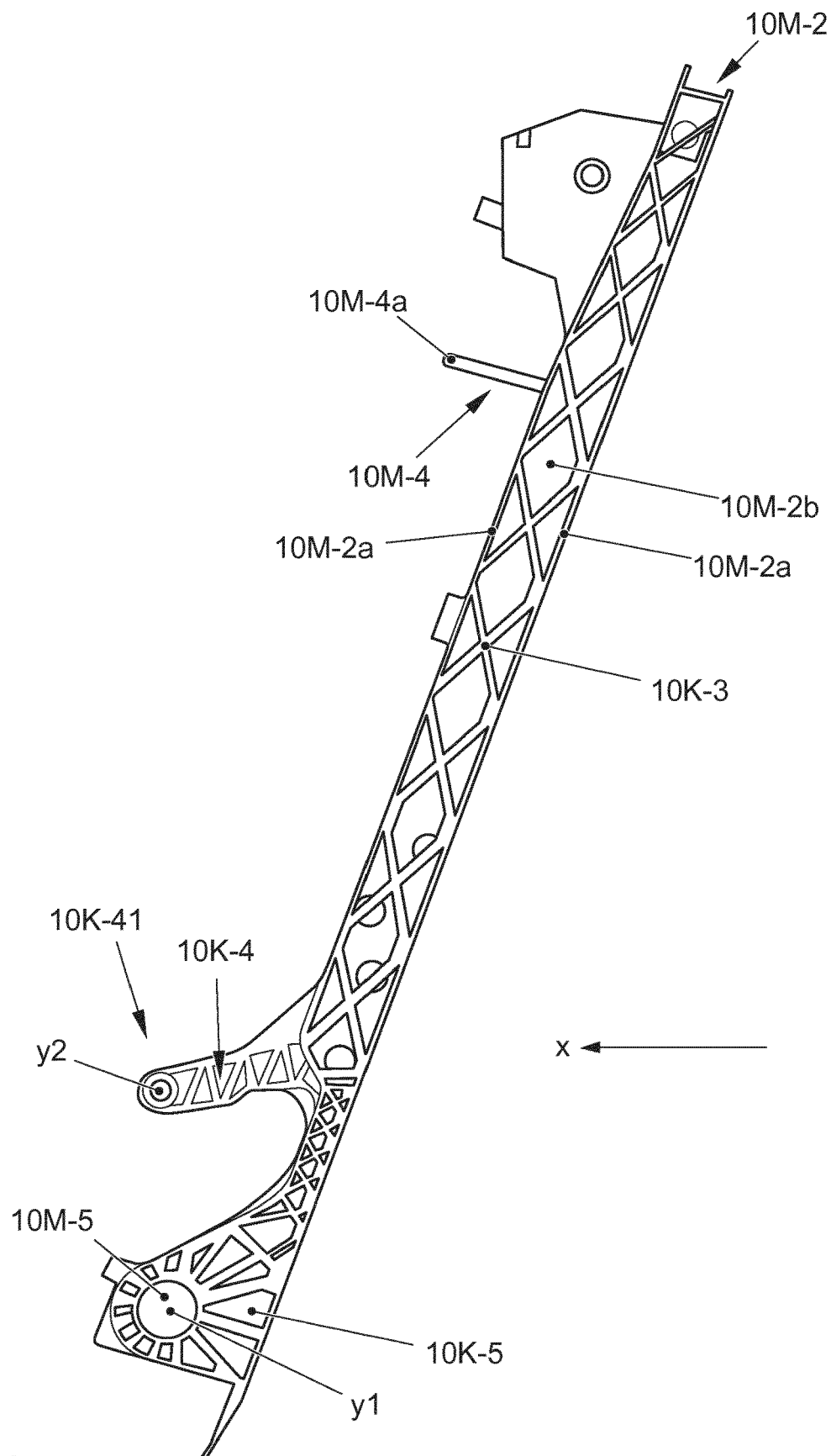
FIG. 6 shows an enlarged representation of a second side rail profile according to FIG. 5C.

FIG. 5F shows a top view of plastic structure 10K, including integrated metal structure 10M (similar to FIG. 3F), top profile 10M-3 of hybrid support structure 10M being rotated 90° around an imaginary horizontal rotation axis out of the page plane, so that the viewer is looking at metal structure [hybrid support structure] 10 from above.

Sixth Area:

A sixth area relates to extrusion coating 10K-6 of top profile 10M-3, as clarified by FIGS. 5E and 5F.

Seventh Area:

Finally, a base plate 10K-7 is manufactured as the seventh area during the manufacture of hybrid support structure 10, which gives hybrid support structure 10 as a whole a plate-like shape.

In the installation situation of hybrid support structure 10, base plate 10K-7 directly forms the rear termination of hybrid support structure 10 (cf. FIG. 5B) on the side facing away from the occupant in the area of first spiderweb substructure 10K-1a.

In the area of second spiderweb substructure 10K-1b, base plate 10K-7 is formed in parallel on insert 10M-6 disposed eccentrically between side rail profiles 10M-1, 10M-2, viewed in the x direction, and thus indirectly forms the rear termination of hybrid support structure 10. The direct rear termination of hybrid support structure 10 facing away from the occupant is formed by second spiderweb substructure 10K-1b of spiderweb structure 10K (cf. FIG. 5B).

In the folded-up installation situation of hybrid support structure 10, insert 10M-6 in the exemplary embodiment is disposed eccentrically in the direction of the occupant. This arrangement of insert 10M-6 facing more toward the occupant results, in particular, due to the selection of the depth of ribs 1v 1h of second spiderweb substructure 10K-1b or spiderweb structure 10K-1 situated in the x direction. Ribs 1v, 1h of second spiderweb substructure 10K-1b of spiderweb structure 10K-1 and base plate 10K-7 are connected to each other upon completion of hybrid support structure 10 and generate a protective function for cargo L striking the back of hybrid support structure 10 in the crash case according to front-end crash load case V (cf. FIG. 2), as explained in greater detail below.

Depending on which maximum permissible component stresses are permitted in the model calculation of ribs 1v, 1h of second spiderweb substructure 0K-1b, the corresponding component dimensions (height×length×depth) result for ribs 1v, 1h, depth T being variable, viewed in the x direction, depending, among other things, on the provided permissible component stress. According to this variation, insert 10M-6 is situated either facing more away from the occupant, in the middle or facing more toward the occupant between side rail profiles 10M-1, 10M-2 of hybrid support structure 10.

Depending on which maximum permissible component stresses are permitted during the model calculation of ribs 1v, 1h of second spiderweb substructure 10K-1b, the heights of ribs 1v, 1h, viewed in the z direction (essentially vertically) and the lengths of ribs 1v, 1h, viewed in the y direction (essentially horizontally) are obtained, crossing points K also being defined, which are disposed irregularly according to the topology optimization, as can be seen in the figures.

Crossing points K as well as the heights and lengths of ribs 1v, 1h of second spiderweb substructure 10K-1b also vary according to the maximum permissible component stress provided for second spiderweb substructure 10K-1b.

It is understood that the depths as well as the heights and lengths of ribs 1v, 1h of second spiderweb substructure 10K-b vary accordingly on the front side (cf. FIG. 5A) and the back side (cf. FIG. 5B), depending on the provided maximum permissible component stress.

According to the invention, these considerations apply equally to all other web structures.

The side of second spiderweb substructure 10K-1b facing away from the occupant is discussed in greater detail below, since according to the invention this second spiderweb substructure 10K-1b performs a protective function with respect to striking cargo L according to front-end crash load case V, as mentioned above.

Figure 9B:
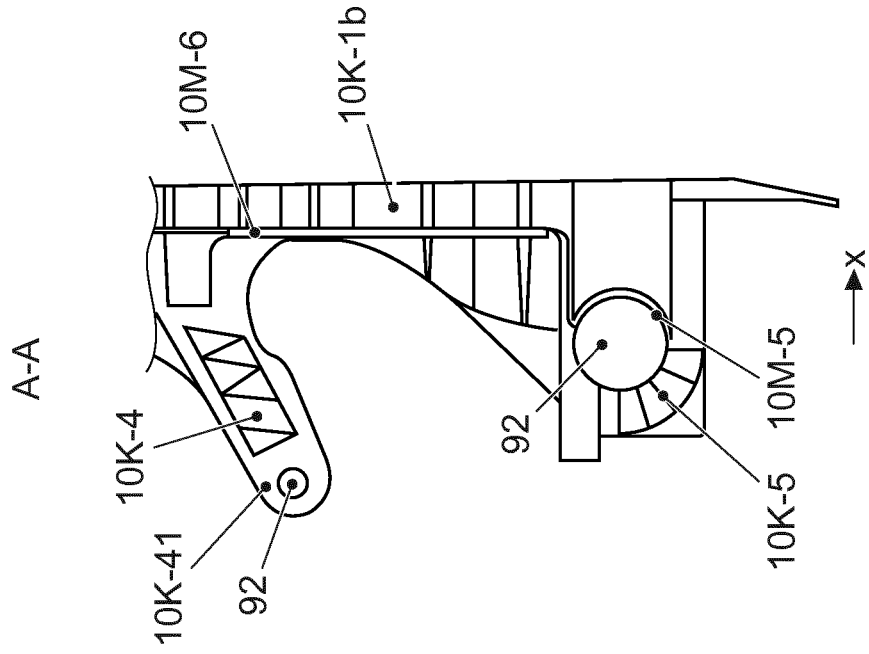
FIG. 9B shows a section A-A according to FIG. 9A of the hybrid support structure under a cushion structure receiving element.
Figure 9A:
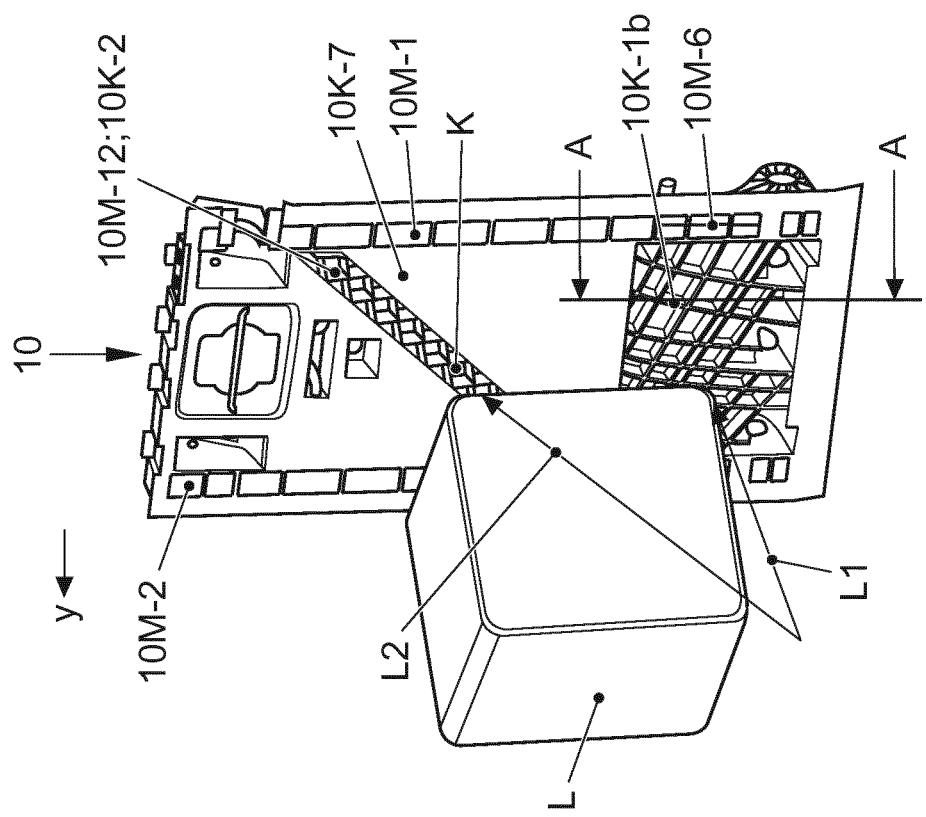
FIG. 9A shows a perspective back side of the hybrid support structure, including a cargo striking a side facing away from the occupant.

FIG. 9A shows a perspective view of the back side of hybrid support structure 10, including cargo L, symbolized by the cargo cube, striking the side facing away from the occupant according to front-end crash load case V. According to arrow tips of arrows L1 and L2, two single-point compact points are defined by design in place of the cargo cube, which may ultimately strike over a wide area.

FIG. 9B shows a section A-A of hybrid support structure 10 under cushion structure receiving element 10K-41 according to FIG. 9A, including the side facing the occupant to the left of metallic insert 10M-6 and the side facing away from the occupant to the right of metallic insert 10M-6.

Ribs 1v, 1h of second spiderweb substructure 10K-1b and the ribs in cross web structure 10K-2 in connecting profile 10M-12 are designed according to the invention as sacrificial ribs on the side of hybrid structure 10 facing away from the occupant, which fail in a defined manner under assumed single-point loading L1, L2 by cargo L and thus absorb so much energy that the rest of hybrid structure 10 remains intact.

A defined energy absorption thus advantageously occurs within the sacrificial ribs, so that a breaking of plastic structure 10K outside areas designed with sacrificial ribs is avoided. To ensure the corresponding function, it is particularly important, as described above, that the depths as well as the heights and lengths of sacrificial ribs 1v, 1h of second spiderweb substructure 10K-1b on the back and corresponding on the front (cf. FIG. 5A and cf. FIG. 5B) vary accordingly depending on the provided maximum permissible component stress.

Similarly, the ribs within cross web structure 10K-2 in connecting profile 10M-12 also vary accordingly in depth as well as in height and in length, possibly changing crossing points K, according to the provided maximum permissible component stress within connecting profile 10M-12.

According to the invention, additionally arranged metallic insert 10M-1 is used to keep plastic parts broken in a defined manner in the crash case away from the area of hybrid support structure 10 of the vehicle seat facing the occupant. In addition, metallic insert 10M-6 ensures that ribs 1v, 1h of second spiderweb substructure 10M-1b disposed in the area facing the occupant (cf. FIG. 5A) do not break.

Cross web structure 10K-2 within metallic connecting profile 10M-12 and metallic connecting profile 10M-12 itself also ensure that ribs 1v, 1h of first spiderweb substructure 10K-1a on the occupant side are not able to break in defined front-end crash load case V.

On the whole, it is thus ensured that the component integrity is retained even in defined front-end crash load case V, it being ensured that a local failure of individual ribs within first and second spiderweb substructures 10K-1a, 10K-1b does not take place.

It is also provided that an occurring deformation of the sacrificial ribs of cross web structure 10K-2 within connecting profile 10M-12 and/or first spiderweb substructure 10K-1a is used in a targeted manner as an indicator. If a deformation of at least one of the sacrificial ribs occurs after a crash case according to front-end crash load case V on the side facing away from the occupant, hybrid support structure 10 may be replaced.

Eighth Area:

An eighth area relates to headrest receptacles 10K-8 (cf. FIGS. 5A, 7A and 8), which are also manufactured from plastic during the manufacture of hybrid support structure 10. A number of essentially vertically oriented ribs 1v and essentially horizontally oriented ribs 1h of first spiderweb substructure 10K-1a are led up to headrest receptacles 10K-81 and support them stably within hybrid support structure 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A hybrid support structure for a backrest part of a vehicle seat or a vehicle back bench seat, the hybrid support structure comprising:
   a metal structure including a connecting profile disposed between a first side rail profile and a second side rail profile, the connecting profile connected to the first side rail profile at a first connecting point and connected to the second side rail profile at a second connecting point; and
   a plastic structure, the plastic structure including a web structure having a central rib,
   wherein the first side rail profile is parallel to the second side rail profile and the connecting profile extends diagonally between the first side rail profile and the second side rail profile,
   wherein the connecting profile and the central rib extend along a same line, the same line being a load path-optimized main load line which runs between the first and second connecting points.

2. The hybrid support structure according to claim 1, wherein the metal structure and the plastic structure are connected to form the hybrid support structure in an injection molding process.

3. The hybrid support structure according to claim 2, wherein the metal structure is an assembly made up of multiple metallic components, the multiple metallic components being first arranged and then connected to each other via the plastic structure in the injection molding process, wherein the plastic structure is formed as a single part.

4. The hybrid support structure according to claim 1, wherein the web structure of the plastic structure encompasses the central rib as well as essentially horizontal ribs extending from the central rib and essentially vertical ribs, the horizontal ribs and the vertical ribs connected to each other via crossing points.

5. The hybrid support structure according to claim 4, wherein a spanned plane of the web structure extends between the first and second side rail profiles and extends from headrest receptacles of the plastic structure provided on an upper end of the hybrid support structure to a first horizontal axis provided on a lower end of the hybrid support structure, the first horizontal axis being a rotation axis.

6. The hybrid support structure according to claim 5, wherein metallic receiving sleeves are disposed in the first and second side rail profiles of the hybrid support structure and are aligned with the first horizontal axis, the metallic receiving sleeves being fixedly connected to the plastic structure, the plastic structure at each of the metallic receiving sleeves being formed as a circular segment web structure having ribs extending regularly or irregularly in a ray-shaped manner about the first horizontal axis, whereby the circular segment web structure forms circular segment-shaped honeycombs.

7. The hybrid support structure according to claim 5, wherein the web structure of the plastic structure includes a first and a second web substructure, which are formed continuously on a back side of the hybrid support structure and in an interrupted manner on a front side of the hybrid support structure.

8. The hybrid support structure according to claim 7, wherein a spanned plane of the first web substructure extends between the first and second side rail profiles and extends from the headrest receptacles of the plastic structure provided on the upper end of the hybrid support structure to a second horizontal axis, the second horizontal axis being provided between the upper end of the hybrid support structure and the first horizontal axis.

9. The hybrid support structure according to claim 8, wherein a spanned plane of the second web substructure extends between the first and second side rail profiles and extends from the second horizontal axis to the first horizontal axis.

10. The hybrid support structure according to claim 9, wherein, within the plane spanned by the second web substructure, a metallic insert is disposed between the first and second side rail profiles and divides the second web substructure into a front-side and a back-side web substructure.

11. The hybrid support structure according to claim 1, wherein the connecting profile disposed between the first and second side rail profiles is designed as a C profile, which has two opposite profile legs, which extend to the back side of the hybrid support structure, wherein between the two opposite profile legs, another web structure is formed as a cross web structure formed from crossing ribs, which essentially form triangular honeycombs or rectangular honeycombs having crossing points.

12. The hybrid support structure according to claim 1, wherein the first and second side rail profiles are designed as C profiles, which have two opposite profile legs, which project laterally from the hybrid support structure, wherein between the two opposite profile legs, another web structure is formed as a cross web structure formed from regularly crossing ribs, which essentially form triangular honeycombs or rectangular honeycombs having crossing points.

13. The hybrid support structure according to claim 1, wherein the plastic structure comprises a cushion structure receiving element, which has another web structure on the side of the cushion structure receiving element, the another web structure being a triangular web structure, which is formed from angled ribs, which essentially form triangular honeycombs having crossing points.

14. The hybrid support structure according to claim 13, wherein the metal structure includes a metallic profile wire which has a projection, so that a cushion structure may be fastened to the cushion structure receiving element and the projection of the metallic profile wire.

15. The hybrid support structure according to claim 1, wherein the metal structure comprises a metallic top profile, which is provided with an extrusion coating made from plastic, the extrusion coating being part of the plastic structure.

16. The hybrid support structure according to claim 1, wherein the plastic structure comprises a base plate and/or a headrest receptacle.

* * * * *